United States Patent
Rahman et al.

(10) Patent No.: US 12,356,386 B2
(45) Date of Patent: Jul. 8, 2025

(54) METHOD AND APPARATUS FOR DOWNLINK AND UPLINK MULTI-BEAM OPERATION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/659,461

(22) Filed: Apr. 15, 2022

(65) Prior Publication Data

US 2022/0240238 A1 Jul. 28, 2022

Related U.S. Application Data

(63) Continuation of application No. 16/902,179, filed on Jun. 15, 2020, now Pat. No. 11,317,412.

(Continued)

(51) Int. Cl.
*H04W 72/04* (2023.01)
*H04L 5/00* (2006.01)
(Continued)

(52) U.S. Cl.
CPC ......... *H04W 72/046* (2013.01); *H04L 5/0048* (2013.01); *H04W 72/23* (2023.01)

(58) Field of Classification Search
CPC .... H04W 72/046; H04W 72/23; H04L 5/0048
See application file for complete search history.

(56) References Cited

U.S. PATENT DOCUMENTS

| 11,115,962 B2 | 9/2021 | Kang et al. |
| 11,902,990 B2 | 2/2024 | Li |

(Continued)

FOREIGN PATENT DOCUMENTS

| CN | 109792745 A | 5/2019 |
| TW | 201924242 A | 6/2019 |
| WO | 2018128376 A1 | 7/2018 |

OTHER PUBLICATIONS

Extended European Search Report issued Jun. 1, 2023 regarding Application No. 20830618.3, 11 pages.

(Continued)

*Primary Examiner* — Ronald B Abelson

(57) ABSTRACT

A method for operating a user equipment (UE) comprises receiving configuration information including multiple transmission configuration indicator (TCI) states, and receiving a beam indication indicating a TCI state from the multiple TCI states. The TCI state indicates a beam for each of N entities ($E_1, E_2, \ldots E_N$), and the TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$. The method includes determining the beam for each of N entities ($E_1, E_2, \ldots E_N$) indicated by the TCI state, and transmitting an uplink (UL) transmission or receiving a downlink (DL) transmission based on the beam for each of N entities ($E_1, E_2, \ldots E_N$).

20 Claims, 15 Drawing Sheets

Related U.S. Application Data

(60) Provisional application No. 63/022,305, filed on May 8, 2020, provisional application No. 63/020,790, filed on May 6, 2020, provisional application No. 62/868,283, filed on Jun. 28, 2019.

(51) Int. Cl.
  *H04W 72/044* (2023.01)
  *H04W 72/23* (2023.01)

(56) References Cited

U.S. PATENT DOCUMENTS

| | | | |
|---|---|---|---|
| 2019/0103908 A1* | 4/2019 | Yu | H04B 7/0617 |
| 2019/0141692 A1 | 5/2019 | Subramanian et al. | |
| 2019/0356420 A1* | 11/2019 | Wilson | H04B 7/0408 |
| 2020/0100225 A1 | 3/2020 | Khoshnevisan et al. | |
| 2020/0186232 A1* | 6/2020 | Levitsky | H04B 7/0617 |
| 2020/0314857 A1* | 10/2020 | Pezeshki | H04W 16/28 |
| 2021/0184733 A1 | 6/2021 | Cao | |
| 2021/0378045 A1* | 12/2021 | Zhang | H04W 76/25 |
| 2021/0391899 A1* | 12/2021 | Cao | H04B 17/373 |
| 2022/0124751 A1* | 4/2022 | Matsumura | H04B 7/0617 |

OTHER PUBLICATIONS

"Corrections on EN-DC—CSI L 1 parameters", Draft Change Request: 3GPP TS 38.331 V. 15.0.1, 3GPP TSG-RAN WG2 Meeting #101, Feb. 2018, 19 pages.
"3rd Generation Partnership Project; Technical Specification Group Radio Access Network; Evolved Universal Terrestrial Radio Access (E-UTRA); Physical channels and modulation (Release 15)", 3GPP TS 36.211 V15.5.0, Mar. 2019, 238 pages.
"3rd Generation Partnership Project; Technical Specification Group Radio Access Network; Evolved Universal Terrestrial Radio Access (E-UTRA); Multiplexing and channel coding (Release 15)", 3GPP TS 36.212 V15.5.0, Mar. 2019, 246 pages.
"3rd Generation Partnership Project; Technical Specification Group Radio Access Network; Evolved Universal Terrestrial Radio Access (E-UTRA); Physical layer procedures (Release 15)", 3GPP TS 36.213 V15.5.0, Mar. 2019, 552 pages.
"3rd Generation Partnership Project; Technical Specification Group Radio Access Network; Evolved Universal Terrestrial Radio Access (E-UTRA); Radio Resource Control (RRC);Protocol specification (Release 15)", 3GPP TS 36.331 V15.5.0, Mar. 2019, 944 pages.
"3rd Generation Partnership Project; Technical Specification Group Radio Access Network; NR; Physical channels and modulation (Release 15)", 3GPP TS 38.211 V15.5.0, Mar. 2019, 96 pages.
"3rd Generation Partnership Project; Technical Specification Group Radio Access Network; NR; Multiplexing and channel coding (Release 15)", 3GPP TS 38.212 V15.5.0, Mar. 2019, 101 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Physical layer measurements, (Release 15)", 3GPP TS 38.215 V15.5.0, Jun. 2019, 16 pages.
"5G; NR; Medium Access Control (MAC) protocol specification (3GPP TS 38.321 version 15.5.0 Release 15)", ETSI TS 138 321 V15.5.0, May 2019, 80 pages.
"3rd Generation Partnership Project; Technical Specification Group Radio Access Network; NR; Radio Resource Control (RRC) protocol specification, (Release 15)", 3GPP TS 38.331 V15.5.0, Mar. 2019, 491 pages.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.5.0, Mar. 2019, 131 pages.
"3rd Generation Partnership Project; Technical Specification Group Radio Access Network; NR; Physical layer procedures for data (Release 15)", 3GPP TS 38.214 V15.5.0, Mar. 2019, 103 pages.
International Search Report of the International Searching Authority in connection with International Patent Application No. PCT/KR2020/008401 dated Oct. 13, 2020, 9 pages.
Nokia et al., "Enhancements on Multi-beam Operation," R1-1907317, 3GPP TSG RAN WG1 #97 Meeting, Reno, Nevada, May 13-May 17, 2019, 20 pages.
NTT Docomo, Inc., "Discussion on multi-beam enhancement," R1-1906225, 3GPP TSG RAN WG1 #97, Reno, USA, May 13-May 17, 2019, 24 pages.
Ericsson, "Enhancements to multi-beam operation," R1-1907436, 3GPP TSG RAN WG1 Meeting #97, Reno, USA, May 13-May 17, 2019, 17 pages.
Samsung, "Enhancements on multi-beam operations," R1-1906969, 3GPP TSG RAN WG1 #97, Reno, USA, May 13-May 17, 2019, 11 pages.
Intellectual Property India, Examination Report issued Mar. 1, 2024 regarding Application No. 202217004603, 6 pages.
MediaTek Inc., "DL and UL Beam Management", 3GPP TSG RAN WG1 Meeting #90bis, R1-1718333, Oct. 2017, 7 pages.
Chinese National Intellectual Property Administration, Office Action issued Apr. 3, 2025 regarding Application No. CN202080047067.4, 16 pages.
European Patent Office, Communication pursuant to Article 94(3) EPC issued May 8, 2025 regarding Application No. 20830618.3, 5 pages.

* cited by examiner

METHOD AND APPARATUS FOR DOWNLINK AND UPLINK MULTI-BEAM OPERATION

CROSS-REFERENCE TO RELATED APPLICATIONS AND CLAIM OF PRIORITY

This application is a continuation of U.S. patent application Ser. No. 16/902,179, filed on Jun. 15, 2020, which claims priority to U.S. Provisional Patent Application No. 62/868,283 filed on Jun. 28, 2019, U.S. Provisional Patent Application No. 63/020,790 filed on May 6, 2020, and U.S. Provisional Patent Application No. 63/022,305, filed on May 8, 2020. The content of the above-identified patent documents is incorporated herein by reference.

TECHNICAL FIELD

The present disclosure relates generally to wireless communication systems and more specifically to downlink and uplink multi-beam operation in a wireless communication system.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment (UE) can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Embodiments of the present disclosure provide methods and apparatuses to enable downlink and uplink multi-beam operation in a wireless communication system.

In one embodiment, a UE is provided. The UE comprises a transceiver configured to receive configuration information including multiple transmission configuration indicator (TCI) states, and receive a beam indication indicating a TCI state from the multiple TCI states. The TCI state indicates a beam for each of N entities ($E_1, E_2, \ldots E_N$). The TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$. The UE further includes a processor operably connected to the transceiver. The processor is configured to determine the beam for each of N entities ($E_1, E_2, \ldots E_N$) indicated by the TCI state. The transceiver is configured to transmit an uplink (UL) transmission or receive a downlink (DL) transmission based on the beam for each of N entities ($E_1, E_2, \ldots E_N$).

In another embodiment, a BS in a wireless communication system is provided. The BS includes a processor configured to generate configuration information including multiple transmission configuration indicator (TCI) states, and generate a beam indication indicating a TCI state from the multiple TCI states. The BS further includes a transceiver operably coupled to the processor. The transceiver is configured to transmit the configuration information including the multiple TCI states, and transmit the beam indication indicating the TCI state from the multiple TCI states. The TCI state indicates a beam for each of N entities ($E_1, E_2, \ldots E_N$). The TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$. The transceiver is configured to receive an uplink (UL) transmission or transmit a downlink (DL) transmission based on the beam for each of N entities ($E_1, E_2, \ldots E_N$).

In yet another embodiment, a method for operating a UE is provided. The method comprises receiving configuration information including multiple transmission configuration indicator (TCI) states, receiving a beam indication indicating a TCI state from the multiple TCI states, wherein the TCI state indicates a beam for each of N entities ($E_1, E_2, \ldots E_N$), and wherein the TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$, determining the beam for each of N entities ($E_1, E_2, \ldots E_N$) indicated by the TCI state, and transmitting an uplink (UL) transmission or receiving a downlink (DL) transmission based on the beam for each of N entities ($E_1, E_2, \ldots E_N$).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
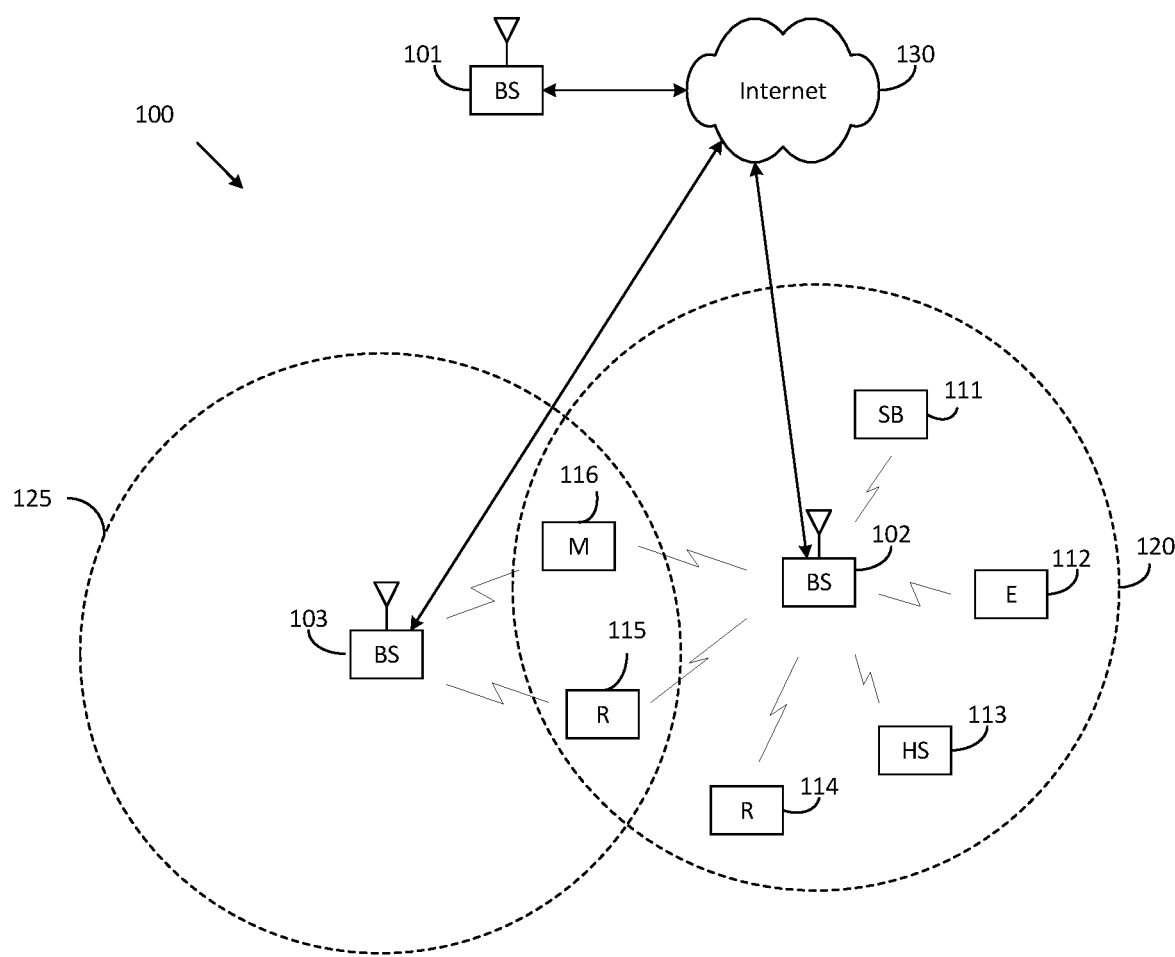
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.1.0, "E-UTRA, Physical channels and modulation;" 3GPP TS 36.212 v16.1.0, "E-UTRA, Multiplexing and Channel coding;" 3GPP TS 36.213 v16.1.0, "E-UTRA, Physical Layer Procedures;" 3GPP TS 36.321 v16.1.0, "E-UTRA, Medium Access Control (MAC) protocol specification;" 3GPP TS 36.331 v16.1.0, "E-UTRA, Radio Resource Control (RRC) protocol specification;" 3GPP TR 22.891 v14.2.0; 3GPP TS 38.211 v16.1.0, "E-UTRA, NR, Physical channels and modulation;" 3GPP TS 38.213 v16.1.0, "E-UTRA, NR, Physical Layer Procedures for control;" 3GPP TS 38.214 v16.1.0, "E-UTRA, NR, Physical layer procedures for data;" and 3GPP TS 38.212 v16.1.0, "E-UTRA, NR, Multiplexing and channel coding."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
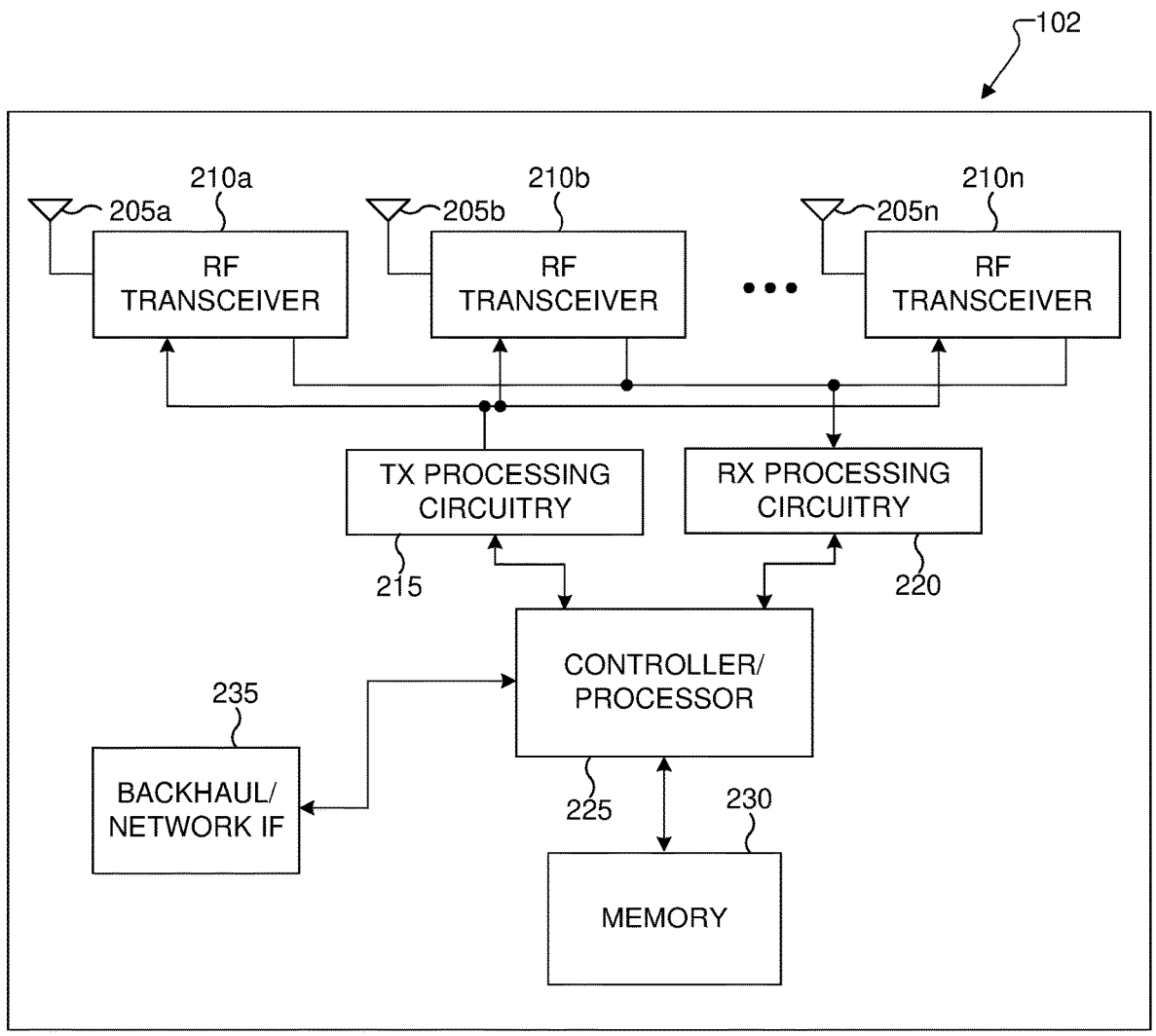
FIG. 2 illustrates an example gNB according to embodiments of the present disclosure.
Figure 3:
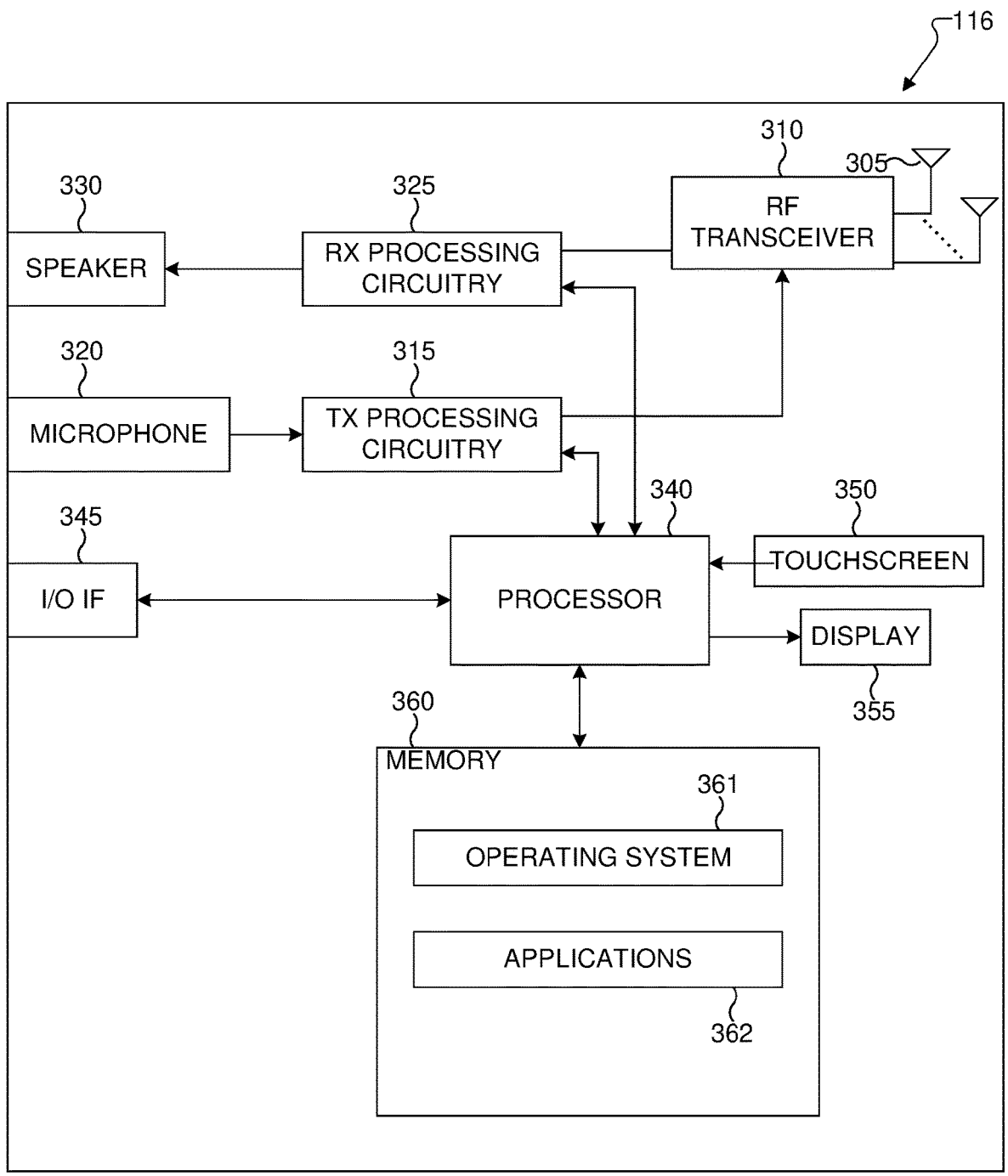
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving an indication for joint TCI state based multi-beam operation for communication in a wireless communication system, and one or more of the gNBs 101-103 includes circuitry, programing, or a combination thereof, for transmitting an indication for joint TCI state based multi-beam operation communication in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI-RS measurement and for CSI feedback on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
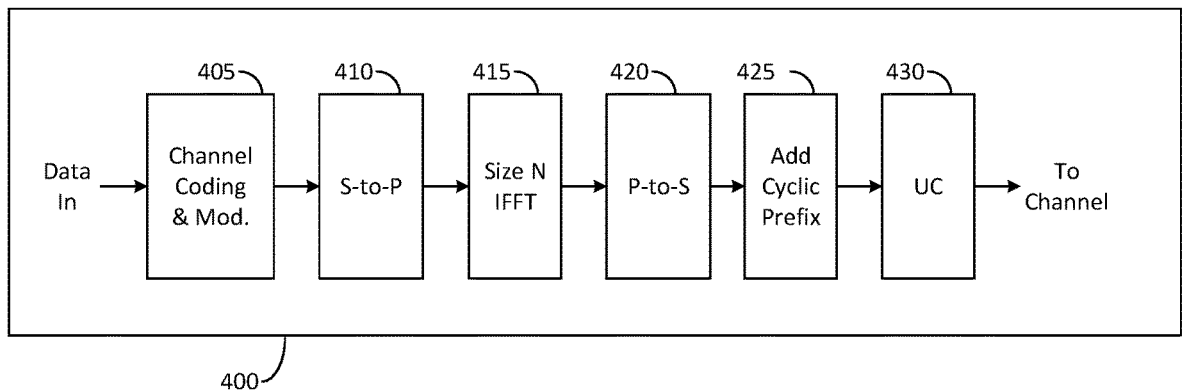
FIG. 4A illustrates a high-level diagram of an orthogonal frequency division multiple access transmit path according to embodiments of the present disclosure.
Figure 4B:
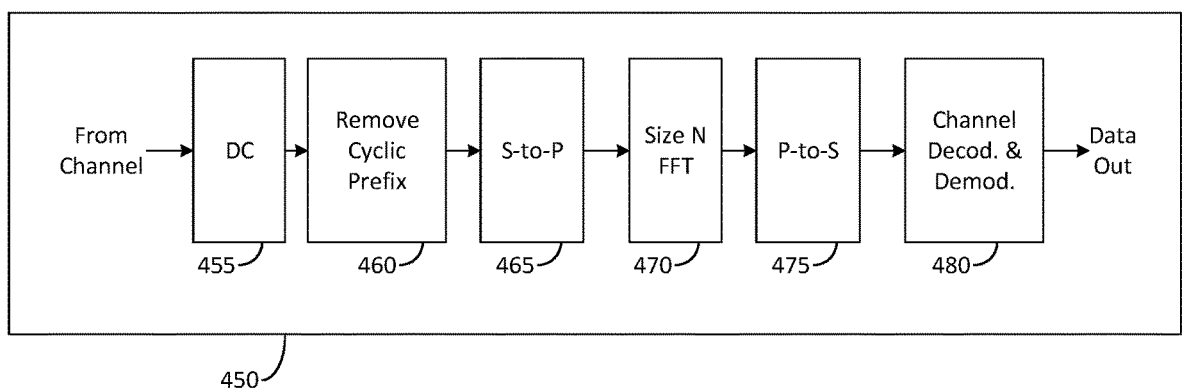
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

The 5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
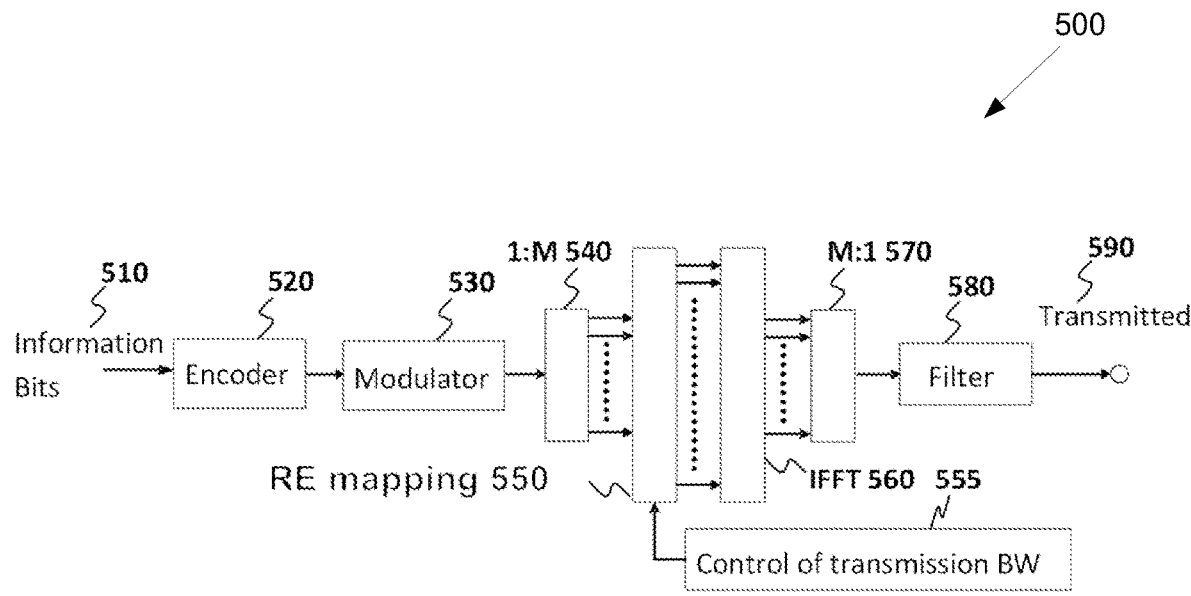
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
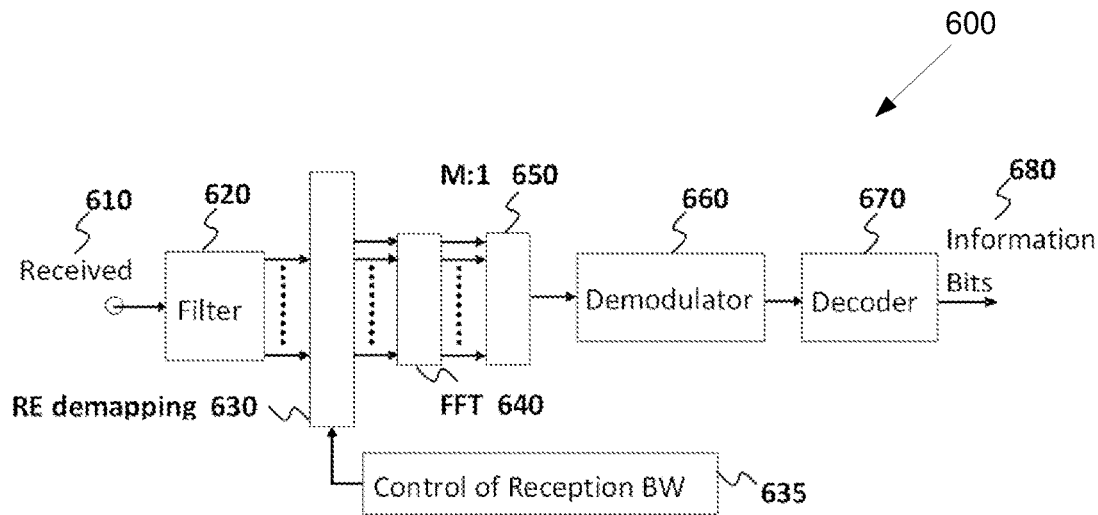
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
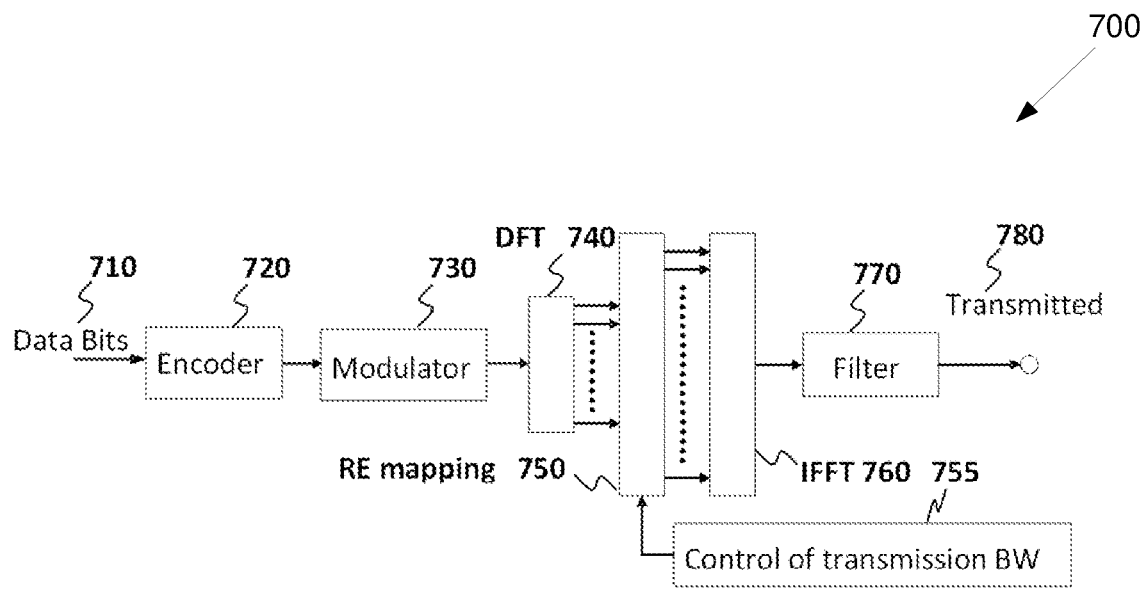
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
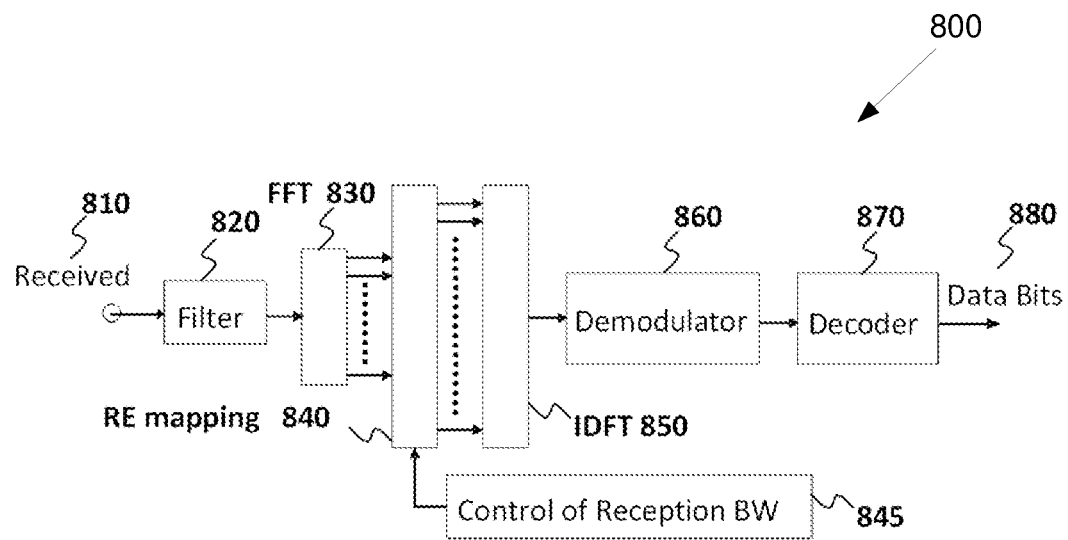
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
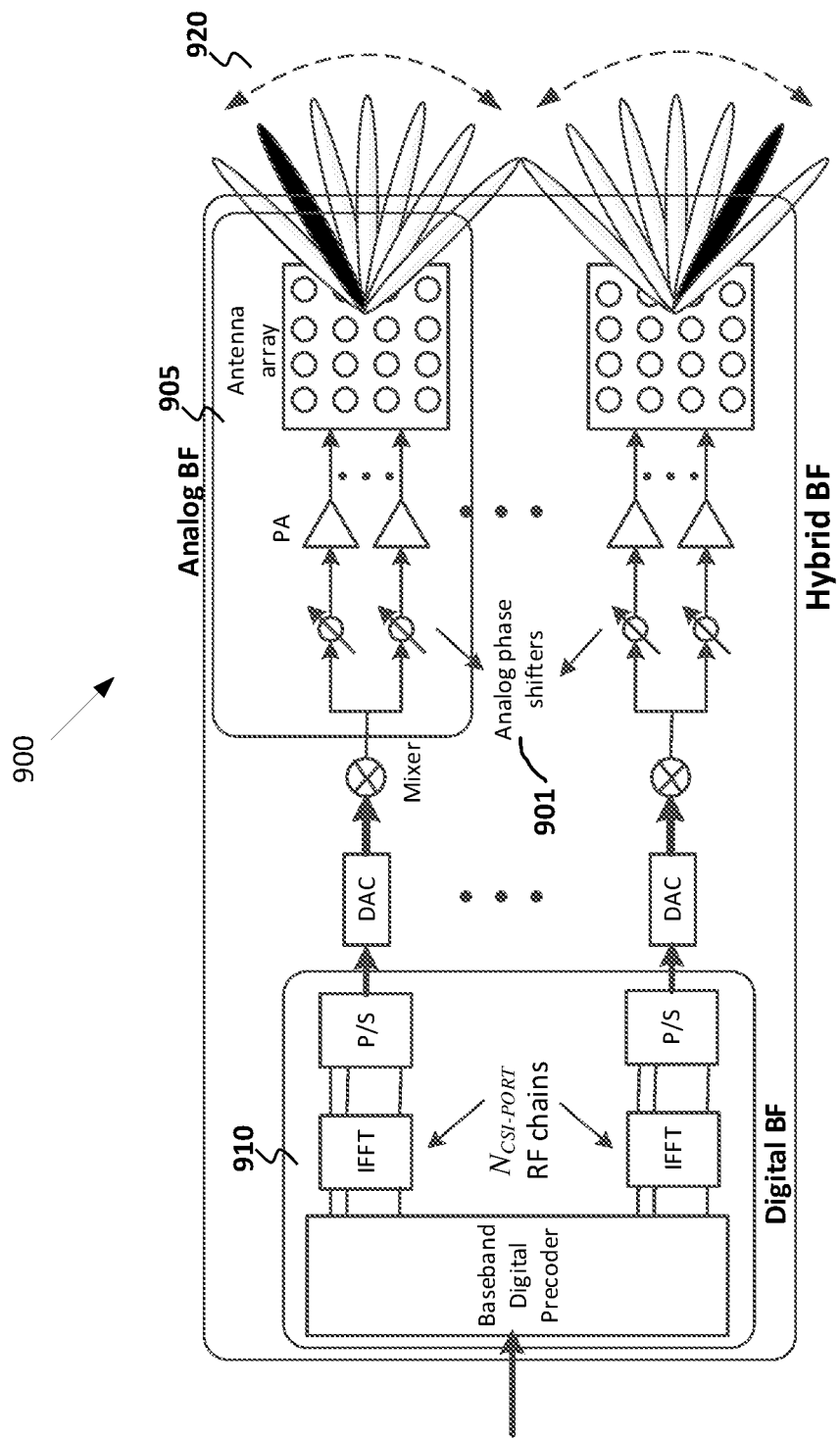
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

The 3GPP LTE and NR specifications support up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles 920 by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Because the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

In 5G NR systems, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

For UL multi-beam operation where a UE is equipped with a plurality of panels (each panel is able to transmit via one analog beam), using the same UL TX beam for all the panels is sub-optimal for at least two reasons. First, at best, only diversity-type transmission can be supported since using the same TX beam for multiple panels will most likely result in a low-rank (rank-one, in particular) channel. Second, the nature of mmWave propagating channel (also termed the frequency range 2 or FR2 in 3GPP) allows different blocking profiles for different panels. Since blocking results in no propagation, any transmission from a "blocked" panel is wasteful. Therefore, an UL beam indication for multiple TX beams is beneficial for UEs with multiple panels.

In addition, it is desirable to minimize the need for frequent RRC (L3) reconfiguration in multi-beam operation. This is because multi-beam operation is intended to circumvent higher-layer (L3) procedures such as mobility. In general, procedures that result in lower latency and, preferably, lower overhead, will be beneficial.

Therefore, there is a need for UL beam indication methods that can reap the potential benefits from UEs with multiple antenna panels. There is also a need for reducing latency and/or overhead for such methods.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of UL TX beam or DL RX beam, such as direction, precoding/beamforming, number of ports, etc. For instance, for UL, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam or DL RX beam to the UE. Optionally, the reference RS can be transmitted by the UE (in this case, the reference RS is a downlink signal such as SRS or DMRS). As the NW/gNB receives the reference RS, the NW/gNB can measure and calculate the needed information to assign a particular UL TX beam or DL RX beam to the UE.

The reference RS can be dynamically triggered by the NW/gNB (e.g. via DCI in case of aperiodic RS), preconfigured with a certain time-domain behavior (such as periodicity and offset, in case of periodic RS), or a combination of such pre-configuration and activation/deactivation (in case of semi-persistent RS).

For mmWave (or FR2) where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS). Therefore, when DL RS (such as CSI-RS and/or SSB) is used as reference RS, the NW/gNB transmits the DL RS to the UE (which is associated with a selection of DL TX beam). In response, the UE measures the DL RS (and in the process selects a DL RX beam) and reports the beam metric associated with the quality of the DL RS. In this case, the UE determines the TX-RX beam pair for every configured (DL) reference RS. Therefore, although this knowledge is unavailable to the NW/gNB, the UE—upon receiving a DL RS (hence DL TX beam) indication from the NW/gNB—can select the DL RX beam from the knowledge on all the TX-RX beam pairs. On the other hand, when UL RS (such as SRS and/or DMRS) is used as reference RS (pertinent when DL-UL beam correspondence or reciprocity holds), the NW/gNB triggers or configures the UE to transmit the UL RS (for DL and by reciprocity, this corresponds to a DL RX beam). The gNB, upon receiving and measuring the UL RS, selects a DL TX beam. As a result, a TX-RX beam pair is derived. The NW/gNB can perform this operation for all the configured UL RSs (either per reference RS or "beam sweeping") and determine all the TX-RX beam pairs associated with all the UL RSs configured to the UE.

The following two embodiments (A-1 and A-2) are examples of DL multi-beam operations that utilize DL-TCI-based DL beam indication. In the first example embodiment (A-1), aperiodic CSI-RS is transmitted by the NW and measured by the UE. This embodiment can be used whether UL-DL beam correspondence holds or not. In the second example embodiment (A-2), aperiodic SRS is triggered by the NW and transmitted by the UE so that the NW (or a gNB) can measure the UL channel quality for the purpose of assigning a DL RX beam. This embodiment can be used when UL-DL beam correspondence holds. Although aperiodic RS is used in these two examples, periodic or semi-persistent RS can also be used.

Figure 10:
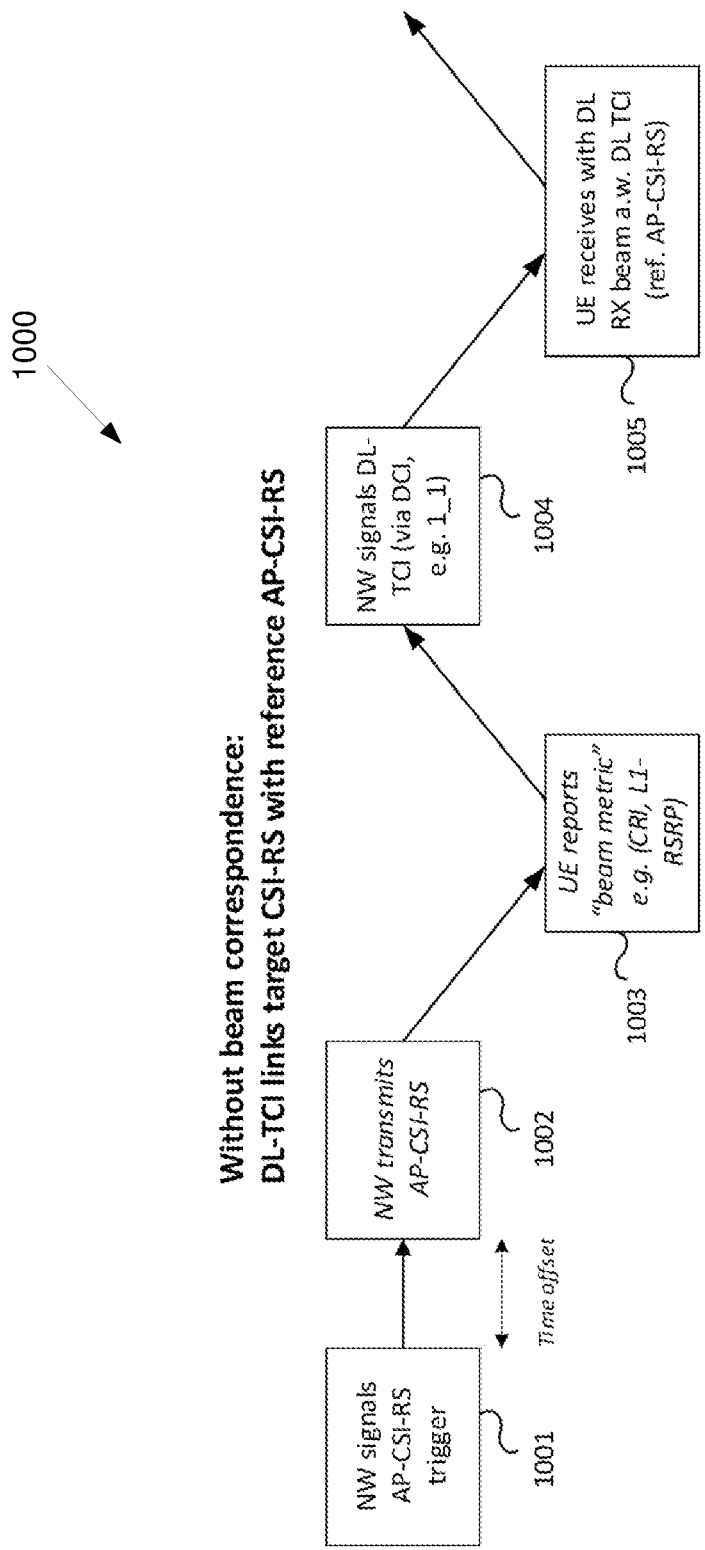
FIG. 10 illustrates a downlink multi-beam operation according to embodiments of the present disclosure.

In one example illustrated in FIG. 10 (embodiment A-1), a DL multi-beam operation 1000 is shown. The embodiment of the DL multi-beam operation 1000 illustrated in FIG. 10 is for illustration only. FIG. 10 does not limit the scope of this disclosure to any particular implementation of the DL multi-beam operation 1000.

The DL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an DL RX beam for the UE and indicate the DL RX beam selection (step 1004) using the DL-TCI field in the DL-related DCI (that carries the DL grant, such as DCI format 1_1 in NR). In this case, the DL-TCI indicates a reference RS (in this case, an AP-CSI-RS) representing the selected DL TX beam (by the gNB/NW). In addition, the DL-TCI can also indicate a "target" RS (e.g., CSI-RS) that is linked to the reference RS (in this case, an AP-CSI-RS). Upon successfully decoding the DL-related DCI with the DL-TCI, the UE selects an DL RX beam and performs DL reception (such as data reception via PDSCH) with the DL RX beam associated with the reference CSI-RS (step 1005).

For this embodiment (A-1), as described above, the UE selects the DL RX beam from the reference RS (in this case AP-CSI-RS) index signaled via the DL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 11:
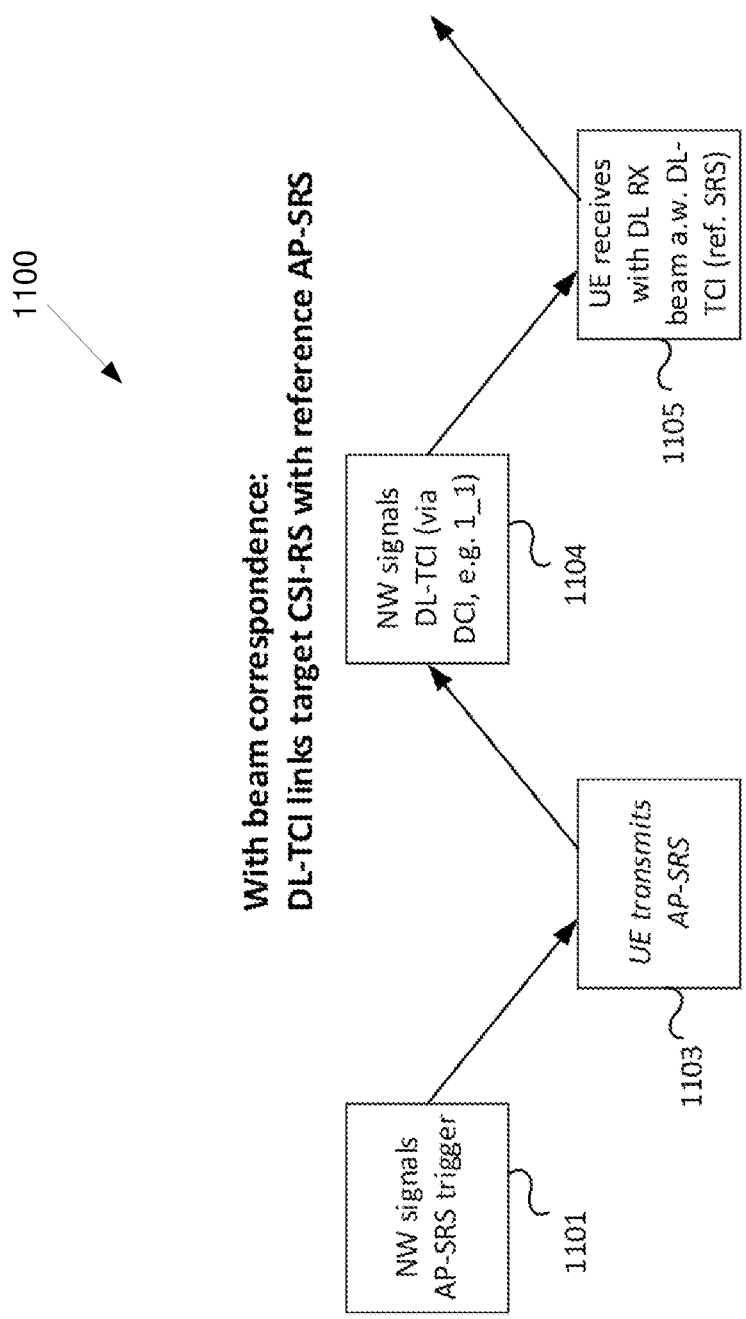
FIG. 11 illustrates a downlink multi-beam operation according to embodiments of the present disclosure.

In another example illustrated in FIG. 11 (embodiment A-2), a DL multi-beam operation 1100 is shown. The embodiment of the DL multi-beam operation 1100 illustrated in FIG. 11 is for illustration only. FIG. 11 does not limit the scope of this disclosure to any particular implementation of the DL multi-beam operation 1100.

The DL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select a DL RX beam for the UE for DL (assuming beam correspondence holds).

The gNB/NW can then indicate the DL RX beam selection (step 1104) using the DL-TCI field in the DL-related DCI (that carries the DL grant, such as DCI format 1_1 in NR). In this case, the DL-TCI indicates a reference RS (in this case, an AP-SRS) representing the selected DL RX beam. In addition, the DL-TCI can also indicate a "target" RS (e.g. CSI-RS) that is linked to the reference RS (in this case, an AP-SRS). Upon successfully decoding the DL-related DCI with the DL-TCI, the UE performs DL reception (such as data reception via PDSCH) with the DL RX beam indicated by the DL-TCI (step 1105).

For this embodiment (A-2), as described above, the UE selects the DL RX beam based on the UL TX beam associated with the reference RS (AP-SRS) index signaled via the DL-TCI field.

Likewise, for UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

The following two embodiments (B-1 and B-2) are examples of UL multi-beam operations that utilize UL-TCI-based UL beam indication after the network (NW) receives some transmission from the UE. In the first example embodiment (B-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (B-2), aperiodic SRS is triggered by the NW and transmitted by the UE so that the NW (or a gNB) can measure the UL channel quality for the purpose of assigning an UL TX beam. This embodiment can be used whether UL-DL beam correspondence holds or not. Although aperiodic RS is used in these two examples, periodic or semi-persistent RS can also be used.

Figure 12:
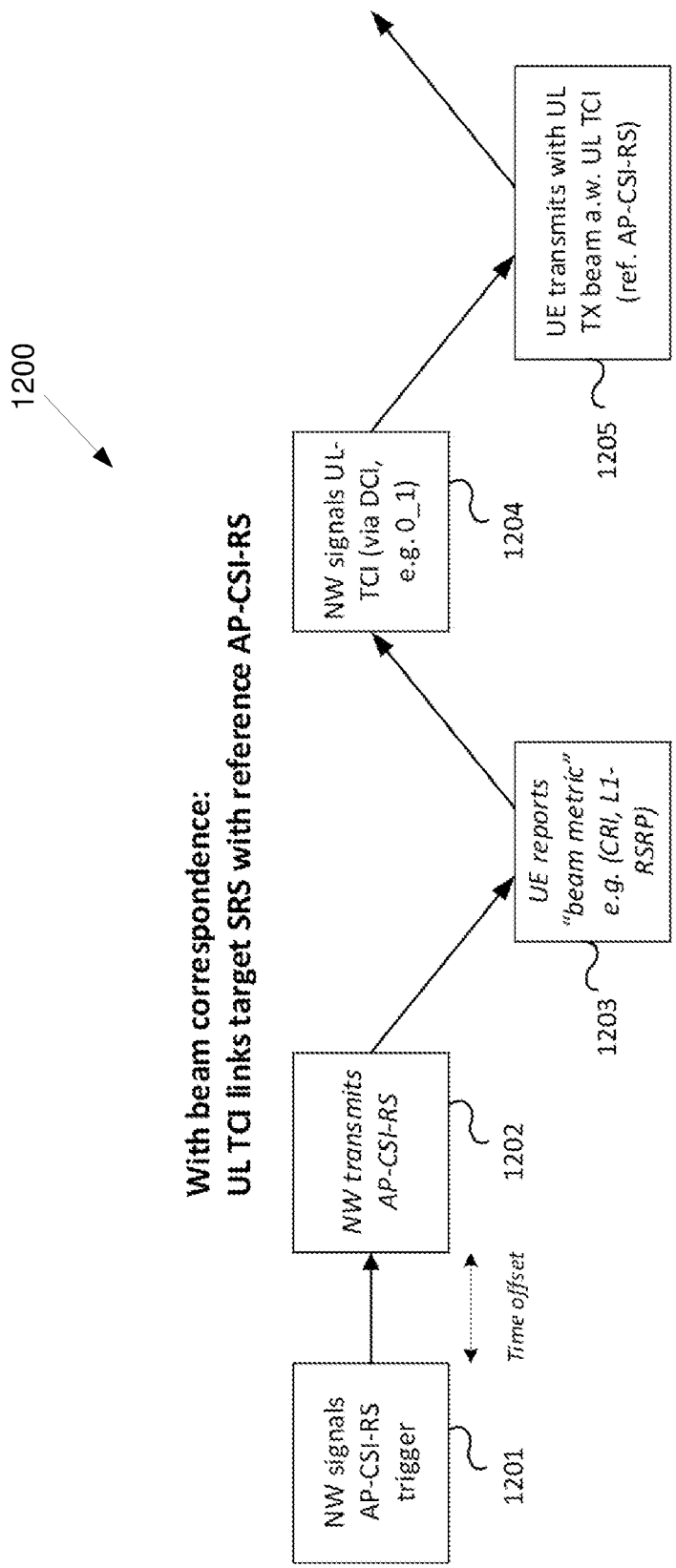
FIG. 12 illustrates an uplink multi-beam operation according to embodiments of the present disclosure.

In another example illustrated in FIG. 12 (embodiment B-1), a UL multi-beam operation 1200 is shown. The embodiment of the UL multi-beam operation 1200 illustrated in FIG. 12 is for illustration only. FIG. 12 does not limit the scope of this disclosure to any particular implementation of the DL multi-beam operation 1200.

The UL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (indicating quality of a particular TX beam hypothesis) (step 1203). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX beam for the UE and indicate the UL TX beam selection (step 1204) using the UL-TCI field in the UL-related DCI (that carries the UL grant, such as DCI format 0_1 in NR). In this case, the UL-TCI indicates a reference RS (in this case, an AP-CSI-RS) representing the selected UL RX beam (by the gNB/NW). In addition, the UL-TCI can also indicate a "target" RS (e.g., SRS) that is linked to the reference RS (in this case, an AP-CSI-RS). Upon successfully decoding the UL-related DCI with the UL-TCI, the UE selects an UL TX beam and performs UL transmission (such as data transmission on PUSCH) with the UL TX beam associated with the reference CSI-RS (step 1205).

For this embodiment (B-1), as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 13:
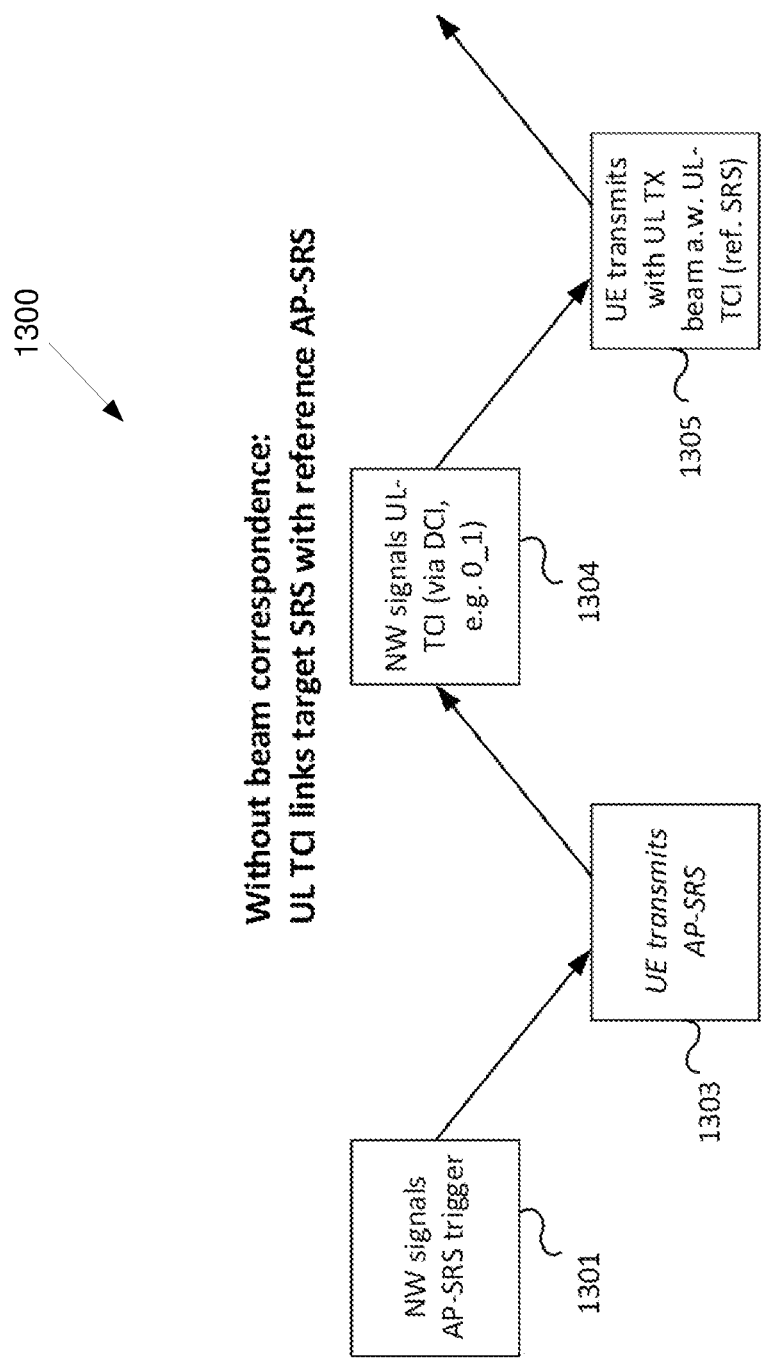
FIG. 13 illustrates an uplink multi-beam operation according to embodiments of the present disclosure.

In another example illustrated in FIG. 13 (embodiment B-2), an UL multi-beam operation 1300 is shown. The embodiment of the UL multi-beam operation 1300 illustrated in FIG. 13 is for illustration only. FIG. 13 does not limit the scope of this disclosure to any particular implementation of the UL multi-beam operation 1300.

The UL multi-beam operation 1300 starts with the gNB/NW signaling to a UE an aperiodic SRS (AP-SRS) trigger or request (step 1301). This trigger can be included in a DCI (either UL-related or DL-related). Upon receiving and decoding the AP-SRS trigger (step 1302), the UE transmits AP-SRS to the gNB/NW (step 1303) so that the NW (or gNB) can measure the UL propagation channel and select an UL TX beam for the UE.

The gNB/NW can then indicate the UL TX beam selection (step 1304) using the UL-TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g. SRS) that is linked to the reference RS (in this case, an AP-SRS). Upon successfully decoding the UL-related DCI with the UL-TCI, the UE performs UL transmission (such as data transmission on PUSCH) with the UL TX beam indicated by the UL-TCI (step 1305).

For this embodiment (B-2), as described above, the UE selects the UL TX beam from the reference RS (in this case SRS) index signaled via the UL-TCI field.

In the above example embodiments, the DL and UL beam indication are separate (decoupled), i.e., the DL beam indication is based on DL-TCI indication and UL beam indication is based on UL-TCI. In the present disclosure, a joint TCI that couples DL and UL beam indications (either partially or fully) is proposed. An example use case of the proposed joint TCI indication can be a reciprocal system in which UL-DL beam correspondence holds.

The present disclosure includes the following components. A first component includes the structure of the joint TCI.

In one embodiment 1, a UE is configured/indicated with a joint TCI, denoted as J-TCI, state indicating both UL and DL beam indication, wherein each J-TCI includes/comprises up to three components (A, B, C), where:
  A: includes/comprises common components such as RSs and/or parameters for both UL and DL,
  B: includes/comprises DL-specific components such as RSs and/or parameters for DL, and
  C: includes/comprises UL-specific components such as RSs and/or parameters for UL.

Hence, up to two components (A, B) are used to indicate/configure DL-TCI and up to two components (A, C) are used to indicate/configure UL-TCI, i.e., DL-TCI=(A, B) and UL-TCI=(A, C). In addition, any of components A, B, and C can be empty (i.e., does not exist, hence not included in J-TCI).

At least one of the following sub-embodiments can be used (to indicate/configure J-TCI) by the gNB or network (NW).

In one sub-embodiment 1A, the component A is empty (i.e., does not exist or not included in J-TCI), and J-TCI comprises two components (B, C). Hence, UL and DL beam indication is separate via DL-TCI=B and UL-TCI=C since there is no common component (A) indicated/configured to the UE.

In one sub-embodiment 1B, the component B and C are empty (i.e., do not exist or not included in J-TCI), and J-TCI comprises only one component A. Hence, UL and DL beam indication is joint via DL-TCI=UL-TCI=J-TCI=A since there is no DL-specific component (B) or UL-specific component (C) indicated/configured to the UE.

In one sub-embodiment 1C, the component B is empty (i.e., does not exist or not included in J-TCI), and J-TCI comprises two components (A, C). Hence, DL beam indication is via DL-TCI=A, and UL beam indication is via UL-TCI=J-TCI=(A, C). Some components of UL-TCI are common with (the same as) DL-TCI=A, and the remaining components (C) are indicated/configured additionally.

In one example 1C-1, the remaining components (C) indicates K=1 panel selection (single panel selection, SPS) for UL transmission for the case when there are N>1 antenna panels at the UE.

In one example 1C-2, the remaining components (C) indicates either K=1 panel selection (SPS) or K>1 panel selection (multi-panel selection, MPS) for UL transmission for the case when there are N>1 antenna panels at the UE.

In one example 1C-3, the remaining components (C) indicates per panel parameters for the case when there are N>1 antenna panels at the UE.

In one example 1C-4, the remaining components (C) indicates K=1 panel selection (single panel selection, SPS) for UL transmission and per panel parameters for the case when there are N>1 antenna panels at the UE.

In one example 1C-5, the remaining components (C) indicates either K=1 panel selection (SPS) or K>1 panel selection (multi-panel selection, MPS) for UL transmission and per panel parameters for the case when there are N>1 antenna panels at the UE.

In the above examples, the K panel selection (SPS or MPS) is indicated via SRI included in the component C, where the SRI indicates (or is associated with) the K panel(s) selected out of N antenna panels. Alternatively, the K panel selection is indicated via panel-ID indication included in the component C, where the panel-ID indicates (or is associated with) the K panel(s) selected out of N antenna panels. In addition, a few examples of per-panel parameters include timing parameters (e.g. timing advance or TA), panel-ID, and RS ID (e.g. SRI).

In one sub-embodiment 1D, the component C is empty (i.e., does not exist or not included in J-TCI), and J-TCI comprises two components (A, B). Hence, the DL beam indication is via DL-TCI=J-TCI=(A, B), and the UL beam indication is via UL-TCI=A. Some components of DL-TCI are common with (the same as) UL-TCI=A, and the remaining components (B) are indicated/configured additionally.

In one sub-embodiment 1E, none of components A, B, and C is empty, and J-TCI comprises all three components (A, B, C). Hence, the DL beam indication is via DL-TCI=(A, B), and the UL beam indication is via UL-TCI=(A, C).

In one sub-embodiment 1F, the beam indication is according to sub-embodiment 1B when there is N=1 antenna panel at the UE, and the beam indication is according to sub-embodiment 1C when there are N>1 antenna panels at the UE.

In one example, only one of the above sub-embodiments (1A through 1E) is used/supported to indicate/configure J-TCI. In another example, multiple sub-embodiments are supported, and one of the supported sub-embodiments is indicated/configured to the UE via either higher layer (e.g. RRC) and/or more dynamic MAC CE and/or DCI based signaling.

In one embodiment 1.1, a UE is configured/indicated with a generalized joint TCI, denoted as J-TCI, state indicating beam indications for two entities (E1, E2), wherein each J-TCI includes/comprises up to three components (A0, A1, A2), where:
  A0: includes/comprises common components for beam indications for two entities,
  A1: includes/comprises specific components for entity E1, and
  A2: includes/comprises specific components for entity E2.

Hence, up to two components (A0, A1) are used to indicate/configure the TCI state (beam), TCI1, for entity E1 and up to two components (A0, A2) are used to indicate/configure the TCI state (beam), TCI2, for entity E2, i.e., TCI1=(A0, A1) and TCI2=(A0, A2). In addition, any of components A0, A1, and A2 can be empty (i.e., does not exist, hence not included in J-TCI).

At least one of the following sub-embodiments can be used (to indicate/configure J-TCI) by the gNB or network (NW).

In one sub-embodiment 1.1A, the component A0 is empty (i.e., does not exist or not included in J-TCI), and J-TCI comprises two components (A1, A2). Hence, two beam indications are separate via TCI1=A1 and TCI2=A2 since there is no common component (A0) indicated/configured to the UE.

In one sub-embodiment 1.1B, the components A1 and A2 are empty (i.e., do not exist or not included in J-TCI), and J-TCI comprises only one component A0. Hence, two beam indications are joint via TCI1=TCI2=J-TCI=A0.

In one sub-embodiment 1.1C, the component A1 is empty (i.e., does not exist or not included in J-TCI), and J-TCI comprises two components (A0, A2). Hence, one beam indication is via TCI1=A, and another beam indication is via TCI2=J-TCI=(A0, A2).

In one sub-embodiment 1.1D, the component A2 is empty (i.e., does not exist or not included in J-TCI), and J-TCI comprises two components (A0, A1). Hence, one beam indication is via TCI1=J-TCI=(A0, A1), and another beam indication is via TCI2=A0.

In one sub-embodiment 1.1E, none of components A0, A1, and A2 is empty.

At least one of the following examples can be used.

In one example 1.1.1, two entities (E1, E2)=(all DL channels, all UL channels).

In one example 1.1.2, two entities (E1, E2)=(PDCCH, PDSCH).

In one example 1.1.3, two entities (E1, E2)=(PUCCH, PUSCH).

In one example 1.1.4, two entities (E1, E2)=(PDCCH and PUCCH, PDSCH and PUSCH).

In one example 1.1.5, two entities (E1, E2)=(one of more DL channel(s), one of more UL channel(s)), where one of more DL channel(s) correspond to PDCCH and/or PDSCH, and one of more UL channel(s) correspond to PUCCH and/or PUSCH and/or PRACH.

In one example 1.1.6, two entities (E1, E2)=(DL RS, UL RS).

In one example 1.1.7, two entities (E1, E2)=(DL RS(s) and/or DL channel(s), UL RS(s) and/or UL channel(s)).

In one example 1.1.8, two entities (E1, E2)=(TRP1, TRP2), where TRP1 and TRP2 are two transmit-receive points (TRPs) the UE receives DL reception (PDCCH and/or PDSCH) from and/or transmits UL transmission (PUCCH and/or PUSCH and/or PRACH) to. Optionally, the two beam indications can also be configured for the reception of DL RS(s) and/or the transmission of UL RS(s), where DL RS(s) is transmitted and UL RS(s) is received by one or both TRPs.

In one example 1.1.9, two entities (E1, E2)=(CC1, CC2), where CC1 and CC2 are two component carrier (CCs) the UE receives DL reception (PDCCH and/or PDSCH) from and/or transmits UL transmission (PUCCH and/or PUSCH and/or PRACH) to. Optionally, the two beam indications can also be configured for the reception of DL RS(s) and/or the transmission of UL RS(s), where DL RS(s) and UL RS(s) are associated with one or both TRPs.

In one example 1.1.10, two entities (E1, E2)=(panel1, panel2), where panel1 and panel2 are two antenna panels (at gNB) the UE receives DL reception (PDCCH and/or PDSCH) from and/or transmits UL transmission (PUCCH and/or PUSCH and/or PRACH) to. Optionally, the two beam indications can also be configured for the reception of DL RS(s) and/or the transmission of UL RS(s), where DL RS(s) is transmitted and UL RS(s) is received by one or both panels.

In one example 1.1.11, two entities (E1, E2)=(panel1, panel2), where panel1 and panel2 are two antenna panels (at UE) the UE uses to receive DL reception (PDCCH and/or PDSCH) and/or transmit UL transmission (PUCCH and/or PUSCH and/or PRACH). Optionally, the two beam indications can also be configured for the reception of DL RS(s) and/or the transmission of UL RS(s), where DL RS(s) is received and UL RS(s) is transmitted by one or both panels.

In one embodiment 1.2, a UE is configured/indicated with a generalized joint TCI, denoted as J-TCI, state indicating beam indications for N>1 entities ($E_1, E_2, \ldots E_N$), wherein each J-TCI includes/comprises up to N+1 components ($A_0, A_1, A_2, \ldots, A_N$), where:

$A_0$: includes/comprises common components for beam indications for two entities, and $A_n$: includes/comprises specific components for entity $E_n$, for n=1, 2, . . . , N.

Hence, up to two components ($A_0, A_n$) are used to indicate/configure TCI state (beam), $TCI_n$, for entity $E_n$, i.e., $TCI_n=(A_0, A_n)$. In addition, any of components $A_0, A_1, \ldots A_N$ can be empty (i.e., does not exist, hence not included in Gen-J-TCI).

At least one of the following sub-embodiments can be used (to indicate/configure J-TCI) by the gNB or network (NW).

In one sub-embodiment 1.2A, the component $A_0$ is empty (i.e., does not exist or not included in J-TCI), and J-TCI comprises two components ($A_1, A_2, \ldots, A_N$). Hence, N beam indications are separate via $TCI_n=A_n$, for n=1, 2, . . . , N, since there is no common component ($A_0$) indicated/configured to the UE.

In one sub-embodiment 1.2B, the components $A_1, A_2, \ldots, A_N$ are empty (i.e., do not exist or not included in J-TCI), and J-TCI comprises only one component $A_0$. Hence, N beam indications are joint via $TCI_n=J-TCI=A_0$.

In one sub-embodiment 1.2C, a subset of components $A_1, A_2, \ldots, A_N$ is empty (i.e., does not exist or not included in J-TCI), and J-TCI comprises K+1 components ($A_0, A_{i_1}, \ldots, A_{i_K}$) where K<N is number of components that are not empty, and let $i_1, i_2, \ldots i_K \in \{1, 2, \ldots, N\}$ are their indices. Hence, for components that are empty, the beam indication is via $TCI_n=A_0$, where $n \neq \{i_1, i_2, \ldots '_K\}$ and for components that are not empty, the beam indication is via $TCI_n=J-TCI=(A_0, A_n)$, where $n \in \{i_1, i_2, \ldots i_K\}$.

In one sub-embodiment 1.2D, none of components $A_1, A_2, \ldots, A_N$ is empty.

At least one of the following examples can be used.

In one example 1.2.1, entities ($E_1, E_2, \ldots E_N$)=(channel 1, channel 2, . . . channel N), where channel 1, . . . channel N belongs to a set of all DL and UL channels{PDCCH, PDSCH, PUCCH, PUSCH, PRACH}.

In one example 1.2.2, entities ($E_1, E_2, \ldots E_N$)=(channel 1, channel 2, . . . channel N), where channel 1, . . . channel N belongs to a set of all DL channels{PDCCH, PDSCH,}.

In one example 1.2.3, entities ($E_1, E_2, \ldots E_N$)=(channel 1, channel 2, . . . channel N), where channel 1, . . . channel N belongs to a set of all UL channels{PUCCH, PUSCH, PRACH}.

In one example 1.2.4, entities ($E_1, E_2, \ldots E_N$)=(channel 1, channel 2, . . . channel N), where channel 1, . . . channel N belongs to a set of all DL and UL control channels{PDCCH, PUCCH}.

In one example 1.2.5, entities ($E_1, E_2, \ldots E_N$)=(channel 1, channel 2, . . . channel N), where channel 1, . . . channel N belongs to a set of all DL and UL data/RACH channels{PDSCH, PUSCH, PRACH}.

In one example 1.2.6, entities $(E_1, E_2, \ldots E_N)$=(RS 1, RS 2, ... RS N), where RS 1, ... RS N belongs to a set of all DL and UL RSs {CSI-RS, SSB, SRS, DL DMRS, UL DMRS}.

In one example 1.2.7, entities $(E_1, E_2, \ldots E_N)$=(channel 1 and/or RS 1, channel 2 and/or RS 2, ... channel N and/or RS N)), where channel 1, ... channel N belongs to a set of all DL and UL channels{PDCCH, PDSCH, PUCCH, PUSCH, PRACH}, and RS 1, ... RS N belongs to a set of all DL and UL RSs {CSI-RS, SSB, SRS, DL DMRS, UL DMRS}.

In one example 1.2.8, entities $(E_1, E_2, \ldots E_N)$=(TRP1, TRP2, ... TRPN), where TRP1 ... TRPN are N transmit-receive points (TRPs) the UE receives DL reception (PDCCH and/or PDSCH) from and/or transmits UL transmission (PUCCH and/or PUSCH and/or PRACH) to. Optionally, the N beam indications can also be configured for the reception of DL RS(s) and/or the transmission of UL RS(s), where DL RS(s) is transmitted and UL RS(s) is received by one or multiple of N TRPs.

In one example 1.2.9, entities $(E_1, E_2, \ldots E_N)$=(CC1, CC2, ... CCN), where CC1 ... CCN are N component carrier (CCs) the UE receives DL reception (PDCCH and/or PDSCH) from and/or transmits UL transmission (PUCCH and/or PUSCH and/or PRACH) to. Optionally, the N beam indications can also be configured for the reception of DL RS(s) and/or the transmission of UL RS(s), where DL RS(s) and UL RS(s) are associated with one or multiple of N TRPs.

In one example 1.2.10, entities $(E_1, E_2, \ldots E_N)$=(panel1, panel2, ..., panelN), where panel1 ... panelN are N antenna panels (at gNB) the UE receives DL reception (PDCCH and/or PDSCH) from and/or transmits UL transmission (PUCCH and/or PUSCH and/or PRACH) to. Optionally, the N beam indications can also be configured for the reception of DL RS(s) and/or the transmission of UL RS(s), where DL RS(s) is transmitted and UL RS(s) is received by one or multiple of N panels.

In one example 1.2.11, entities $(E_1, E_2, \ldots E_N)$=(panel1, panel2, ..., panelN), where panel1 ... panelN are N antenna panels (at UE) the UE uses to receive DL reception (PDCCH and/or PDSCH) and/or transmit UL transmission (PUCCH and/or PUSCH and/or PRACH). Optionally, the N beam indications can also be configured for the reception of DL RS(s) and/or the transmission of UL RS(s), where DL RS(s) is received and UL RS(s) is transmitted by one or multiple of N panels.

In the rest of the disclosure, J-TCI=(A, B, C) (cf. embodiment 1) is assumed only for illustration. It is straightforward for a person skilled-in-the-art to apply the following embodiments for other types of joint TCIs including the generalized joint TCI in embodiments 1.1 and 1.2.

In one embodiment 2, the component A comprises a reference RS, the component B comprises a target DL RS, and the component C comprises a target UL RS.

In one sub-embodiment 2A, the reference RS is a DL RS. In one example, the reference DL RS is a NZP CSI-RS. In one example, the reference DL RS is a SSB/PBCH. In one example, the reference DL RS is a DL DMRS. In one example, the reference DL RS is a combination of NZP CSI-RS and SSB/PBCH. In one example, the reference DL RS is other combinations such as (NZP CSI-RS, DL DMRS) or (DL DMRS, SSB/PBCH) or (NZP CSI-RS, SSB/PBCH, DL DMRS).

The UE can be configured with a single set of K RSs for all of the reference DL RS, target DL RS, and target UL RS. Alternatively, the UE can be configured with a first set of $K_1$ RSs for the reference DL RS and target DL RS, and a second set of $K_2$ RSs for the target UL RS. Alternatively, the UE can be configured with a first set of $K_1$ RSs for the reference DL RS, a second set of $K_2$ RSs for the target DL RS, and a third set of $K_3$ RSs for the target UL RS. This configuration can be via higher-layer (such as RRC) signaling.

In one sub-embodiment 2B, the reference RS is an UL RS. In one example, the reference UL RS is a SRS. In one example, the reference UL RS is a UL DMRS. In one example, the reference UL RS is a combination of SRS and UL DMRS.

The UE can be configured with a single set of K RSs for all of the reference DL RS, target DL RS, and target UL RS. The UE can be configured with a first set of $K_1$ RSs for the target DL RS, and a second set of $K_2$ RSs for the reference UL RS and the target UL RS. The UE can be configured with a first set of $K_1$ RSs for the reference DL RS, a second set of $K_2$ RSs for the target DL RS, and a third set of $K_3$ RSs for the target UL RS. This configuration can be via higher-layer (such as RRC) signaling.

The target DL RS (comprising the component B) is according to at least one of the following examples. In one example, the target DL RS is DL DMRS. In one example, the target DL RS is NZP CSI-RS. In one example, the target DL RS is a SSB/PBCH. In one example, the target DL RS is a combination of NZP CSI-RS and SSB/PBCH. In one example, the target DL RS is other combinations such as (NZP CSI-RS, DL DMRS) or (DL DMRS, SSB/PBCH) or (NZP CSI-RS, SSB/PBCH, DL DMRS).

The target UL RS (comprising the component C) is according to at least one of the following examples. In one example, the target UL RS is SRS. In one example, the target UL RS is UL DMRS. In one example, the target UL RS is a combination of SRS and UL DMRS.

An example of J-TCI states according to sub-embodiment 2A is shown in Table 1. An example of J-TCI states according to sub-embodiment 2B is shown in Table 2. The tables show the types of the DL and/or UL RSs along with their indices (shown in parentheses) according to the configured set(s) of RSs. In Table 1 and Table 2, x0 and x1 are indices of NZP CSI-RS resources in the higher-layer (RRC) configured set(s) of RSs. Likewise, v0 and v1 are indices of SSB/PBCH resources, y1 is an index of DL DMRS, z1 is an index of UL DMRS, and u0 and u1 are indices of SRS resources.

TABLE 1

Example of J-TCI

| J-TCI state | A: Reference DL RS (index) | B: Target DL RS (index) | C: Target UL RS (index) | QCL |
|---|---|---|---|---|
| 0 | NZP CSI-RS (x0) | DL DMRS (y1) | UL DMRS (z1) | Type D |
| 1 | NZP CSI-RS (x0) | DL DMRS (y1) | SRS (u1) | Type D |
| 2 | NZP CSI-RS (x0) | SSB/PBCH (v1) | UL DMRS (z1) | Type D |
| 3 | NZP CSI-RS (x0) | SSB/PBCH (v1) | SRS (u1) | Type D |
| 4 | NZP CSI-RS (x0) | NZP CSI-RS (x1) | UL DMRS (z1) | Type D |
| 5 | NZP CSI-RS (x0) | NZP CSI-RS (x1) | SRS (u1) | Type D |
| 6 | NZP CSI-RS (x0) | empty | UL DMRS (z1) | Type D |
| 7 | NZP CSI-RS (x0) | empty | SRS (u1) | Type D |
| 7 | SSB/PBCH (v0) | DL DMRS (y1) | UL DMRS (z1) | Type D |
| 8 | SSB/PBCH (v0) | DL DMRS (y1) | SRS (u1) | Type D |
| 9 | SSB/PBCH (v0) | NZP CSI-RS (x1) | UL DMRS (z1) | Type D |
| 10 | SSB/PBCH (v0) | NZP CSI-RS (x1) | SRS (u1) | Type D |

TABLE 2

Example of J-TCI

| J-TCI state | A: Reference UL RS (index) | B: Target DL RS (index) | C: Target UL RS (index) | QCL |
|---|---|---|---|---|
| 0 | SRS (u0) | DL DMRS (y1) | UL DMRS (z1) | Type D |
| 1 | SRS (u0) | DL DMRS (y1) | SRS (u1) | Type D |
| 2 | SRS (u0) | DL DMRS (y1) | empty | Type D |
| 3 | SRS (u0) | SSB/PBCH (v1) | UL DMRS (z1) | Type D |
| 4 | SRS (u0) | SSB/PBCH (v1) | SRS (u1) | Type D |
| 5 | SRS (u0) | SSB/PBCH (v1) | empty | Type D |

In one embodiment 2.1, the component A comprises a reference RS, the component B is empty, and the component C is empty. In one example, the reference RS is a DL RS (similar to embodiment 2A). An example of J-TCI states is shown in Table 3. In one example, the reference RS is a UL RS (similar to embodiment 2B). An example of J-TCI states according to sub-embodiment 2B is shown in Table 4.

TABLE 3

Example of J-TCI

| J-TCI state | A: Reference DL RS (index) | B | C | QCL |
|---|---|---|---|---|
| 0 | NZP CSI-RS ($x_0$) | empty | empty | Type D |
| 1 | NZP CSI-RS ($x_1$) | empty | empty | Type D |
| ... | NZP CSI-RS (...) | empty | empty | Type D |
| $p_1$ | NZP CSI-RS ($x_{p_1}$) | empty | empty | Type D |
| $p_1 + 1$ | SSB/PBCH ($v_0$) | empty | empty | Type D |
| $p_1 + 2$ | SSB/PBCH ($v_1$) | empty | empty | Type D |
| ... | SSB/PBCH (...) | empty | empty | Type D |
| $p_1 + p_2 - 1$ | SSB/PBCH ($v_{p_2}$) | empty | empty | Type D |

TABLE 4

Example of J-TCI

| J-TCI state | A: Reference UL RS (index) | B | C | QCL |
|---|---|---|---|---|
| 0 | SRS ($u_0$) | empty | empty | Type D |
| 1 | SRS ($u_1$) | empty | empty | Type D |
| ... | SRS (...) | empty | empty | Type D |
| $p_3$ | SRS ($u_{p_3}$) | empty | empty | Type D |

In one embodiment 2.2, the component A comprises a reference RS, the component B comprises a target DL channel, and the component C comprises a target UL channel. In one example, the reference RS is a DL RS (similar to embodiment 2A). In one example, the reference RS is a UL RS (similar to embodiment 2B).

In one example, the target DL channel is PDCCH. In one example, the target DL channel is PDSCH. In one example the target DL channel includes PDCCH and PDSCH. In one example, the target UL channel is PUCCH. In one example, the target UL channel is PUSCH. In one example, the target UL channel includes PUCCH and PUSCH. In one example, the target UL channel is PRACH. In one example, the target UL channel includes PUCCH and PRACH. In one example, the target UL channel includes PUCCH, PDSCH, and PRACH.

In one embodiment 2.3, the component A comprises a reference RS, the component B comprises a target DL channel and/or DL RS, and the component C comprises a target UL channel and/or UL RS. In one example, the reference RS is a DL RS (similar to embodiment 2A). In one example, the reference RS is a UL RS (similar to embodiment 2B). The target DL channel and target UL channel are according to at least one example in embodiment 2.2. The target DL RS and target UL RS are according to at least one example in embodiment 2 and 2.1.

Let $k_1$, $k_2$, and $k_3$ be number of TCI states that are of type J-TCI, DL-TCI, and UL-TCI, respectively, where J-TCI=(A, B, C) where A is not empty and J-TCI is according to some of the embodiments (e.g., 1 or 2) of this disclosure, and DL-TCI and UL-TCI respectively correspond to separate beam indications for DL and UL (e.g., similar to TCI based DL beam indication).

In one embodiment 3, a UE is configured with k>1 TCI states, where the set of k TCI states is according to at least one of the following alternatives.

In one alternative Alt 3-1: all k TCI states are of the same type (either J-TCI, DL-TCI, or UL-TCI), i.e., ($k=k_1$, $k_2=k_3=0$) or ($k=k_2$, $k_1=k_3=0$) or ($k=k_3$, $k_1=k_2=0$).

In one alternative Alt 3-2: $k_1$ TCI states are J-TCI and $k_2=k-k_1$ TCI states are DL-TCI, where $k_1$, $k_2>0$ and $k_3=0$.

In one alternative Alt 3-3: $k_1$ TCI states are J-TCI and $k_3=k-k_1$ TCI states are UL-TCI, where $k_1$, $k_3>0$ and $k_2=0$.

In one alternative Alt 3-4: $k_1$ TCI states are J-TCI, $k_2$ TCI states are DL-TCI, and $k_3=k-k_1-k_2$ TCI states are UL-TCI, where $k_1$, $k_2$, $k_3>0$.

In one example, only one of the above alternatives (3-1 through 3-4) is used/supported for TCI indication. In another example, multiple alternatives are supported, and one of the supported alternatives is indicated/configured to the UE via either higher layer (e.g. RRC) or more dynamic MAC CE or DCI based signaling.

An example of k TCI states and their types are shown in Table 5.

TABLE 5

Example of N TCI States

| TCI state | TCI type |
|---|---|
| 0 | J-TCI ($a_0$) |
| 1 | J-TCI ($a_1$) |
| ... | ... |
| $k_1 - 1$ | J-TCI ($a_{k_1-1}$) |
| $k_1$ | DL-TCI ($b_0$) |
| $k_1 + 1$ | DL-TCI ($b_1$) |
| ... | ... |
| $k_1 + k_2 - 1$ | DL-TCI ($b_{k_2-1}$) |
| $k_1 + k_2$ | UL-TCI ($c_0$) |
| $k_1 + k_2 + 1$ | UL-TCI ($c_1$) |
| ... | ... |
| $k_1 + k_2 + k_3 - 1 = k - 1$ | UL-TCI ($c_{k_3-1}$) |

The k TCI states can be configured via higher-layer (RRC/L3) signaling. Or, they can be configured dynamically, via L2 control signaling (such as MAC control element or MAC CE), or L1 control signaling (via DCI, UL-related and/or DL-related), or a combination between L2 and L1 control signaling. When L1 control signaling is used, a different RNTI can be used to differentiate this signaling from DL assignment and UL grant. Optionally, UE-group DCI (instead of UE-specific DCI) can be used since this mapping can be common across several UEs.

In sub-embodiment 3A, with the set of k TCI states configured (according to embodiment 3), a TCI field can be used in a DL-related DCI to indicate the UL TX and/or DL RX beam selection to the UE. The number of hypotheses for the TCI field is k, therefore $[\log_2 k]$ bits can be used. In this case, TCI is a separate DCI field. Optionally, the k TCI hypotheses can be jointly signaled and/or encoded in another DCI field. In this sub-embodiment, DL-related DCI is used for TCI indication regardless of the TCI type (J-TCI, DL-TCI, or UL-TCI).

In sub-embodiment 3B, with the set of k TCI states configured (according to embodiment 3), a TCI field can be used in a UL-related DCI to indicate the UL TX and/or DL RX beam selection to the UE. The number of hypotheses for the TCI field is k, therefore $[\log_2 k]$ bits can be used. In this case, TCI is a separate DCI field. Optionally, the k TCI hypotheses can be jointly signaled and/or encoded in another DCI field. In this sub-embodiment, UL-related DCI is used for TCI indication regardless of the TCI type (J-TCI, DL-TCI, or UL-TCI).

In one sub-embodiment 3C, with the set of k TCI states configured (according to embodiment 3), the TCI indication is as follows (depending on the TCI type).

When TCI Type is J-TCI, then at least one of the following alternatives is used.

In one alternative Alt 3C-1: the TCI indication is via a TCI field in DL-related DCI.

In one alternative Alt 3C-2: the TCI indication is via a TCI field in UL-related DCI.

In one alternative Alt 3C-3: the TCI indication is via both DL-related DCI and UL-related DCI. For example, the components (A, B) are indicated via a TCI field in DL-related DCI, and the component C is indicated via a TCI field in UL-related DCI.

In one alternative Alt 3C-4: the TCI indication is via both DL-related DCI and UL-related DCI. For example, the component B is indicated via a TCI field in DL-related DCI, and the components (A, C) are indicated via a TCI field in UL-related DCI.

When TCI Type is DL-TCI, a TCI field can be used in a DL-related DCI to indicate the DL RX beam selection to the UE.

When TCI Type is UL-TCI, a TCI field can be used in a UL-related DCI to indicate the UL TX beam selection to the UE.

In one example, the DL-related DCI can either be a dedicated DCI for DL-TCI state indication or a DCI scheduling DL assignment (e.g. PDSCH). In one example, the UL-related DCI can either be a dedicated DCI for UL-TCI state indication or a DCI scheduling UL grant (e.g. PUSCH).

In one embodiment 3.1, a UE is configured with k>1 TCI states, where the set of k TCI states is according to at least one of the following alternatives 3-1 through 3-4. The $k_1$ TCI states correspond to the TCI Type J-TCI=$(A_i, B_i, C_i)$, the $k_2$ TCI states correspond to the TCI Type DL-TCI=$B_i$, and the $k_3$ TCI states correspond to the TCI Type UL-TCI=$C_i$. An example of k TCI states and their types are shown in Table 6.

TABLE 6

Example of k TCI States

| | | Components | | |
|---|---|---|---|---|
| TCI state | TCI type | Common | DL-specific | UL-specific |
| 0 | J-TCI ($a_0$) | $A_0$ | $B_0$ | $C_0$ |
| 1 | J-TCI ($a_1$) | $A_1$ | $B_1$ | $C_1$ |
| ... | ... | | | |
| $k_1 - 1$ | J-TCI ($a_{k_1-1}$) | $A_{k_1-1}$ | $B_{k_1-1}$ | $C_{k_1-1}$ |
| $k_1$ | DL-TCI ($b_0$) | | $B_{k_1}$ | |

TABLE 6-continued

Example of k TCI States

| | | Components | | |
|---|---|---|---|---|
| TCI state | TCI type | Common | DL-specific | UL-specific |
| $k_1 + 1$ | DL-TCI ($b_1$) | | $B_{k_1+1}$ | |
| ... | ... | | ... | |
| $k_1 + k_2 - 1$ | DL-TCI ($b_{k_2-1}$) | | $B_{k_1+k_2-1}$ | |
| $k_1 + k_2$ | UL-TCI ($c_0$) | | | $C_{k_1+k_2}$ |
| $k_1 + k_2 + 1$ | UL-TCI ($c_1$) | | | $C_{k_1+k_2+1}$ |
| ... | ... | | | ... |
| $k_1 + k_2 + k_3 - 1 = k - 1$ | UL-TCI ($c_{k_3-1}$) | | | $C_{k_1+k_2+k_3-1}$ |

In one embodiment 3.2, a UE is configured with a TCI type for DL and UL beam indication, where the TCI type can be joint (J-TCI) or separate (DL-TCI and/or UL-TCI). Depending on the configured TCI type, the UE uses one of the following beam indication mechanisms: (a) the joint DL/UL beam indication via J-TCI or (b) DL beam indication and UL beam indication via DL-TCI and UL-TCI respectively. In one example, this configuration of the TCI type can be via higher layer (RRC) signaling of a parameter, e.g., tci-Type.

The following two embodiments (C-1 and C-2) are examples of DL and/or UL multi-beam operations that utilize J-TCI-based DL and/or UL beam indication. In the first example embodiment (C-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (C-2), aperiodic SRS is triggered by the NW and transmitted by the UE so that the NW (or a gNB) can measure the UL channel quality for the purpose of assigning an UL TX or DL RX beam. This embodiment can be used whether UL-DL beam correspondence holds or not. Although aperiodic RS is used in these two examples, periodic or semi-persistent RS can also be used.

Figure 14:
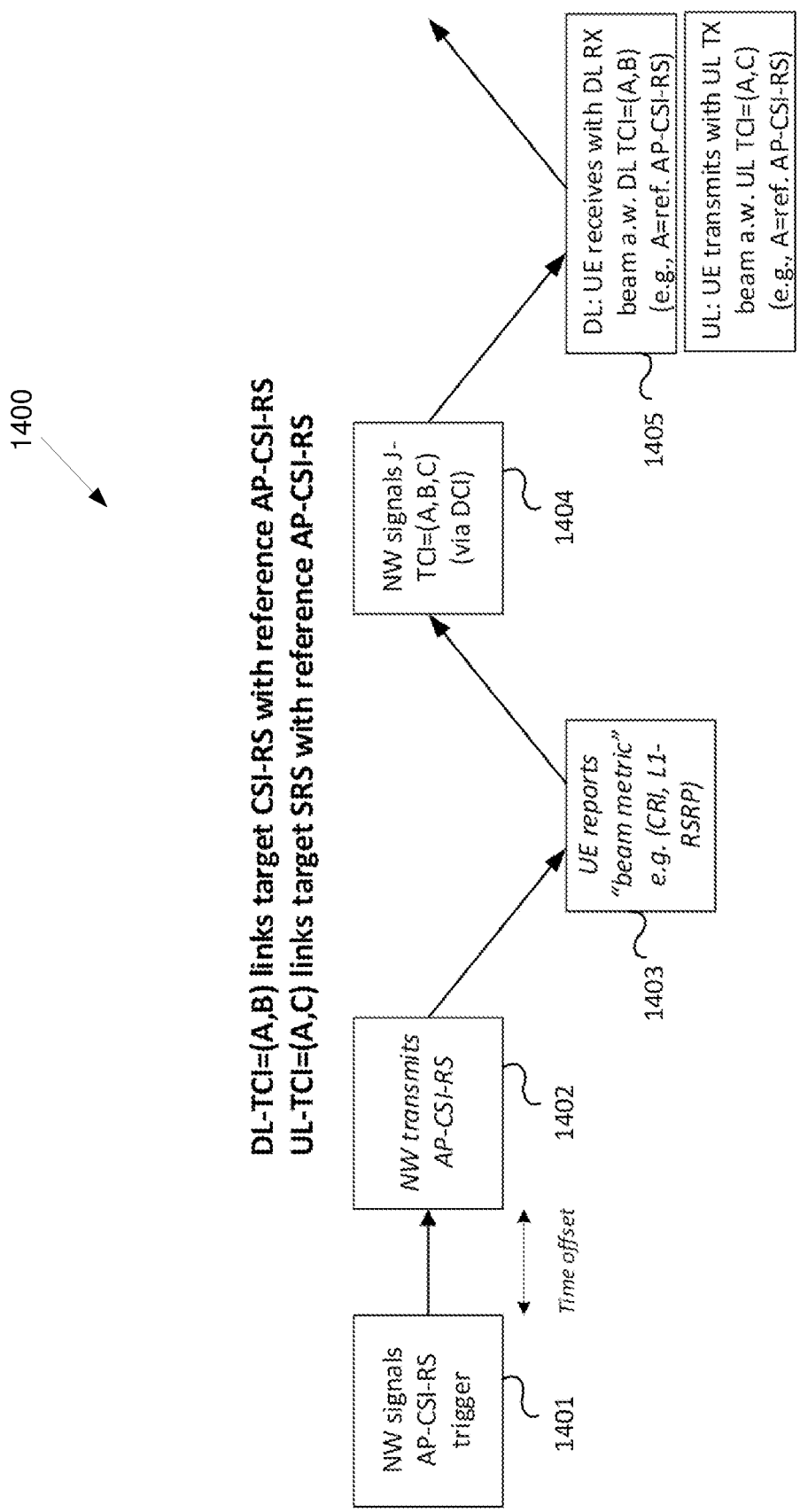
FIG. 14 illustrates a downlink and/or an uplink multi-beam operation according to embodiments of the present disclosure.

In one example illustrated in FIG. 14 (embodiment C-1), a DL and/or UL multi-beam operation 1400 is shown. The embodiment of the DL and/or UL multi-beam operation 1400 illustrated in FIG. 14 is for illustration only. FIG. 14 does not limit the scope of this disclosure to any particular implementation of the DL and/or UL multi-beam operation 1400.

The DL and/or UL multi-beam operation 1400 starts with the gNB/NW signaling to a UE an aperiodic CSI-RS (AP-CSI-RS) trigger or indication (step 1401). This trigger or indication can be included in a DCI (either UL-related or DL-related or both, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1402), the UE measures the AP-CSI-RS and, in turn, calculates and reports a "beam metric" (indicating quality of a particular TX beam hypothesis) (step 1403). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX and/or DL RX beam for the UE and indicate the UL TX and/or DL RX beam selection (step 1404) using the J-TCI field in either the UL-related DCI (that carries the UL grant, such as DCI format 0_1 in NR) or DL-related DCI (that carries the DL assignment, such as DCI format 1_1 in NR) or both. In this case, the J-TCI indicates a reference RS (in this case, an AP-CSI-RS) representing the selected UL RX and/or DL TX beam (by the gNB/NW). Upon successfully decoding the DCI with the J-TCI (in step 1405), for UL, the UE selects an UL TX beam and performs UL transmission (such as data transmission on PUSCH) with the UL TX beam associated with the reference CSI-RS, and for DL, the UE selects an DL RX beam and performs DL reception (such as data reception via PDSCH) with the DL RX beam associated with the reference CSI-RS.

For this embodiment (C-1), as described above, the UE selects the UL TX and/or DL RX beam based on the derived DL RX beam associated with the reference RS index signaled via the J-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 15:
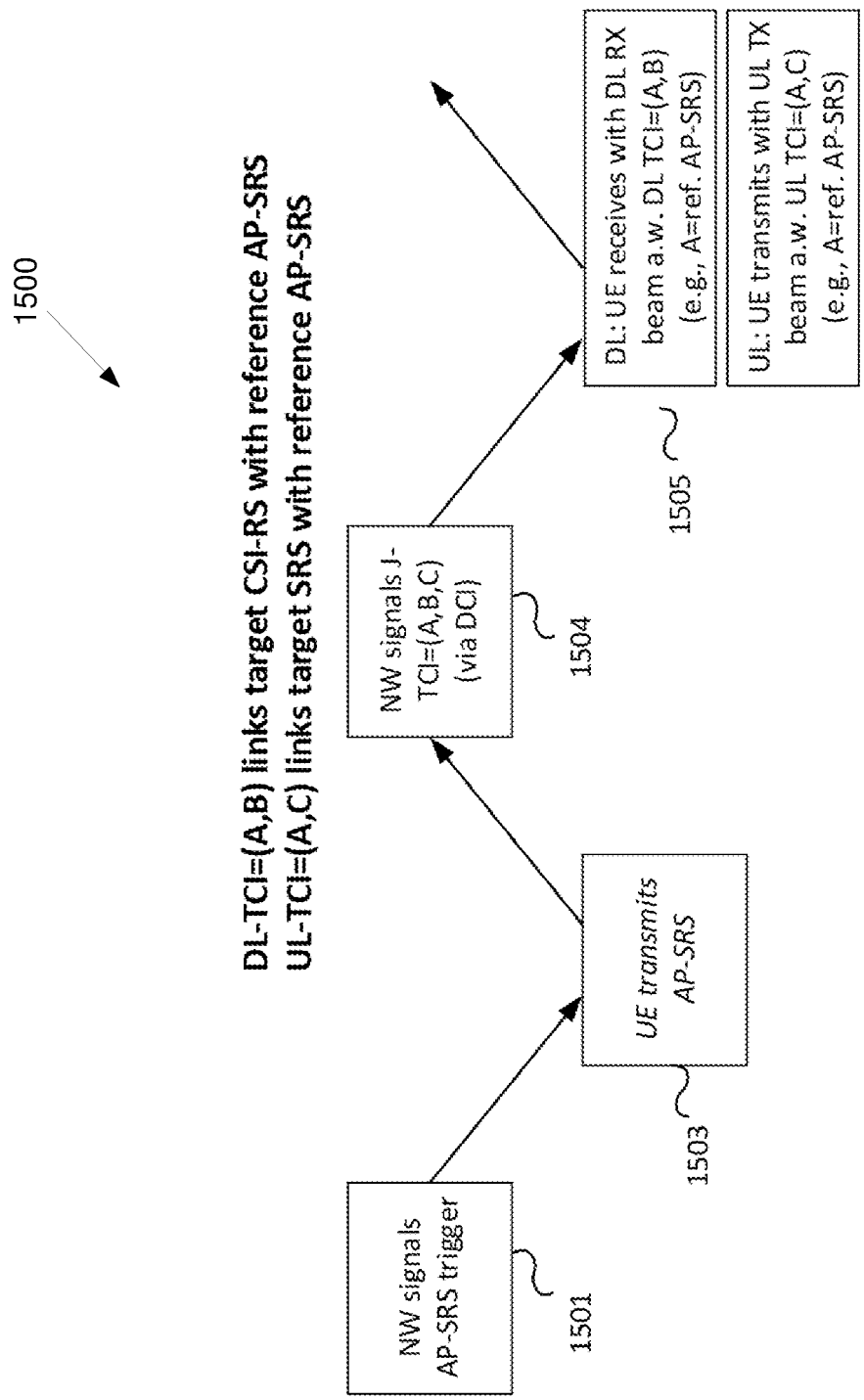
FIG. 15 illustrates a downlink and/or an uplink multi-beam operation according to embodiments of the present disclosure.

In one example illustrated in FIG. 15 (embodiment C-2), a DL and/or UL multi-beam operation 1500 is shown. The embodiment of the DL and/or UL multi-beam operation 1500 illustrated in FIG. 15 is for illustration only. FIG. 15 does not limit the scope of this disclosure to any particular implementation of the DL and/or UL multi-beam operation 1500.

The DL and/or UL multi-beam operation 1500 starts with the gNB/NW signaling to a UE an aperiodic SRS (AP-SRS) trigger or request (step 1501). This trigger can be included in a DCI (either UL-related or DL-related or both). Upon receiving and decoding the AP-SRS trigger (step 1502), the UE transmits AP-SRS to the gNB/NW (step 1503) so that the NW (or gNB) can measure the UL propagation channel and select an UL TX and/or DL RX beam for the UE.

The gNB/NW can then indicate the UL TX or DL RX beam selection (step 1504) using the J-TCI field in either the UL-related DCI (that carries the UL grant, such as DCI format 0_1 in NR) or DL-related DCI (that carries the DL assignment, such as DCI format 1_1 in NR) or both. In this case, the J-TCI indicates a reference RS (in this case, an AP-SRS) representing the selected UL TX and/or DL RX beam. Upon successfully decoding the DCI with the J-TCI (in step 1505), for UL, the UE performs UL transmission (such as data transmission on PUSCH) with the UL TX beam indicated by the J-TCI, and for DL, the UE performs DL reception (such as data reception via PDSCH) with the DL RX beam indicated by the J-TCI.

For this embodiment (C-2), as described above, the UE selects the UL TX and/or DL RX beam from the reference RS (in this case SRS) index signaled via the J-TCI field.

For any of the embodiments or sub-embodiments, the terms TCI, J-TCI, DL-TCI, and UL-TCI field are used for illustrative purposes. Other terms and/or other DCI fields that are of a same functionality (that is, referring to at least one pre-configured TCI, J-TCI, DL-TCI, or UL-TCI state) can be used and are therefore covered in the present disclosure. For instance, the function of the UL-TCI field can also be achieved by reusing the existing SRI field in DCI format 0_1 in NR. In this case, however, the SRI field is interpreted not according to the SpatialRelationInfo in NR, but the UL TCI state definition (that includes a list of reference RS resource IDs) described above. This SRI field can also be extended to accommodate more UL TCI hypotheses, either with one configured SRS resource or more than one configured SRS resources as described above.

Figure 16:
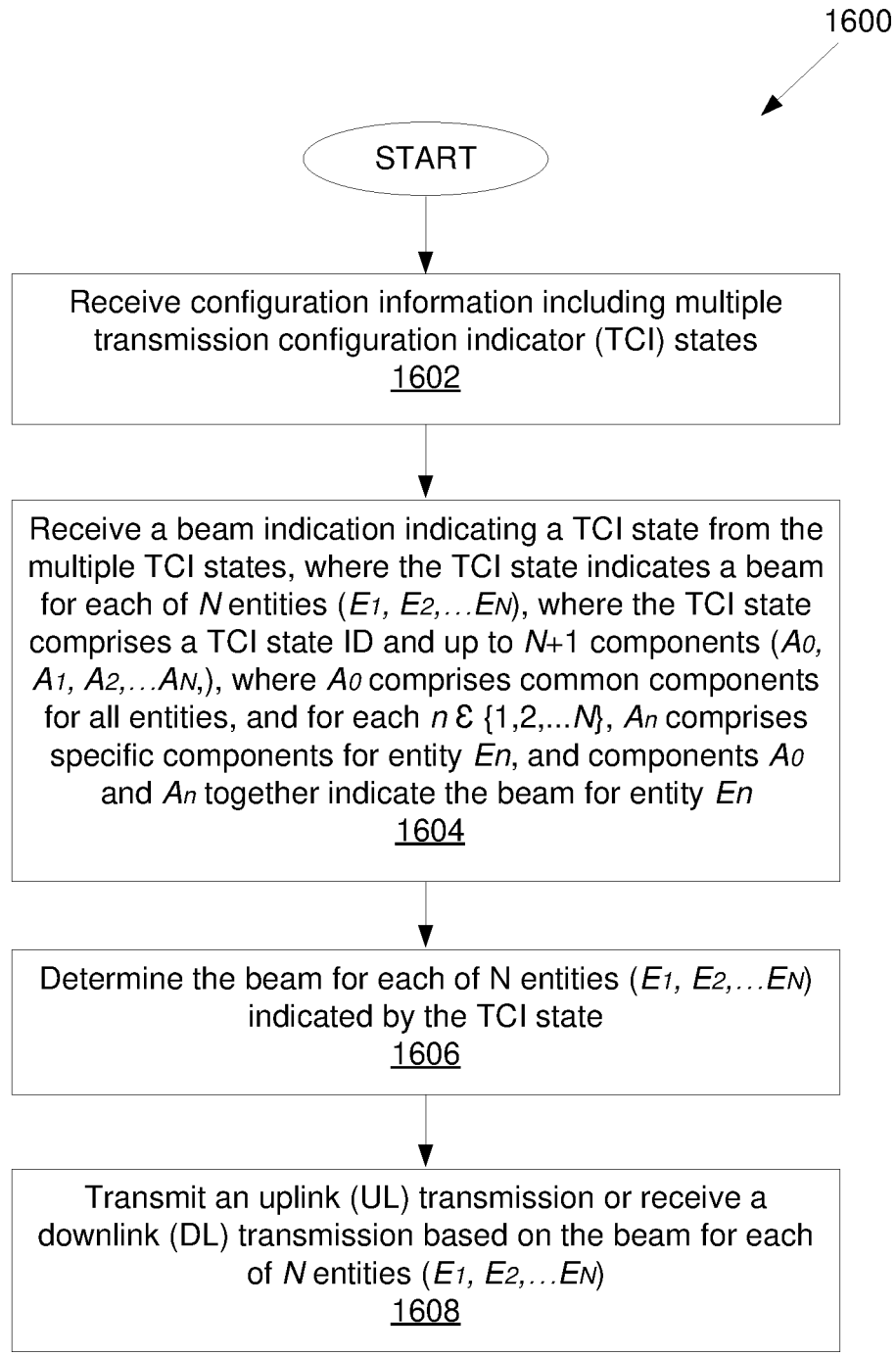
FIG. 16 illustrates a flow chart of a method for operating a user equipment (UE) according to embodiments of the present disclosure.

FIG. 16 illustrates a flow chart of a method 1600 for operating a user equipment (UE), as may be performed by a UE such as UE 116, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the UE (e.g., 111-116 as illustrated in FIG. 1) receives configuration information including multiple transmission configuration indicator (TCI) states.

In step 1604, the UE receives a beam indication indicating a TCI state from the multiple TCI states. The TCI state indicates a beam for each of N entities ($E_1, E_2, \ldots E_N$). The TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$.

In step 1606, the UE determines the beam for each of N entities ($E_1, E_2, \ldots E_N$) indicated by the TCI state.

In step 1608, the UE transmits an uplink (UL) transmission or receives a downlink (DL) transmission based on the beam for each of N entities ($E_1, E_2, \ldots E_N$).

In one embodiment, the beam indication indicating the TCI state is via downlink control information (DCI).

In one embodiment, each component from ($A_0, A_1, A_2, \ldots, A_N$) comprises at least one reference signal from channel state information reference signal (CSI-RS), synchronization signal block (SSB), downlink demodulation reference signal (DL DMRS), sounding reference signal (SRS), or uplink demodulation reference signal (UL DMRS).

In one embodiment, one or more of the components ($A_0, A_1, A_2, \ldots, A_N$) is not included in the TCI state. When $A_0$ is not included, then for each $n \in \{1, \ldots, N\}$, the component $A_n$ indicates the beam for entity $E_n$. When $A_n$ is not included for an $n \in \{1, \ldots, N\}$, the component $A_0$ indicates the beam for entity $E_n$.

In one embodiment, N=2.

In one embodiment, the entity $E_1$ comprises at least one of DL channels, physical downlink control channel (PDCCH) or physical downlink shared channel (PDSCH), and the entity $E_2$ comprises at least one of UL channels, physical uplink control channel (PUCCH), physical uplink shared channel (PUSCH), or physical random access channel (PRACH).

In one embodiment, the entity $E_1$ comprises physical downlink control channel (PDCCH), and the entity $E_2$ comprises physical downlink shared channel (PDSCH).

Figure 17:
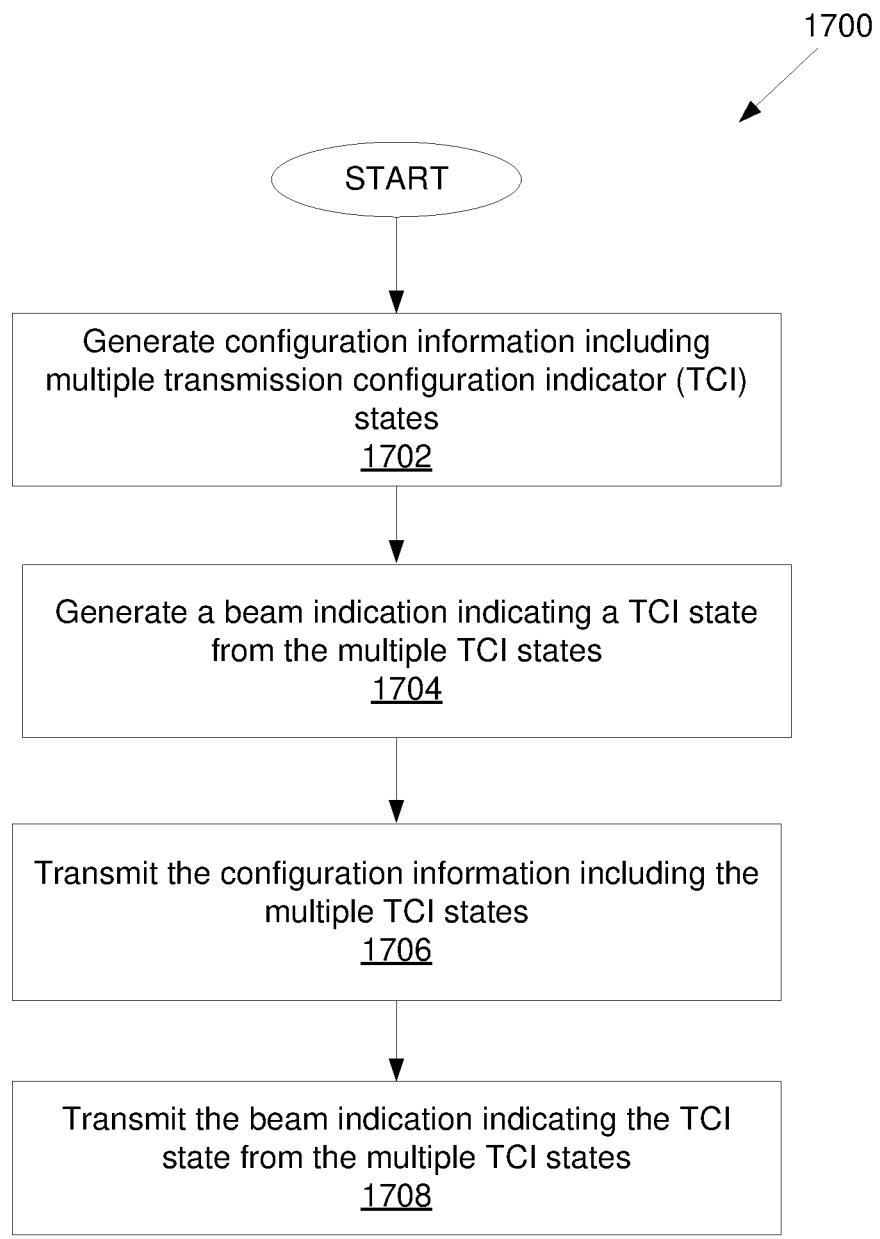
FIG. 17 illustrates a flow chart of another method as may be performed by a BS, according to embodiments of the present disclosure.

FIG. 17 illustrates a flow chart of another method 1700, as may be performed by a base station (BS) such as BS 102, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the BS (e.g., 101-103 as illustrated in FIG. 1), generates configuration information including multiple transmission configuration indicator (TCI) states.

In step 1704, the BS generates a beam indication indicating a TCI state from the multiple TCI states.

In step 1706, the BS transmits the configuration information including the multiple TCI states.

In step 1708, the BS transmits the beam indication indicating the TCI state from the multiple TCI states.

The TCI state indicates a beam for each of N entities ($E_1, E_2, \ldots E_N$), wherein the TCI state comprises a TCI state ID and up to N+1 components ($A_0, A_1, A_2, \ldots, A_N$), where $A_0$ comprises common components for all entities, and for each $n \in \{1, 2, \ldots, N\}$, $A_n$ comprises specific components for entity $E_n$, and components $A_0$ and $A_n$ together indicate the beam for entity $E_n$, and wherein the BS is configured to receive an uplink (UL) transmission or transmit a downlink (DL) transmission based on the beam for each of N entities ($E_1, E_2, \ldots E_N$).

In one embodiment, the beam indication indicating the TCI state is via downlink control information (DCI).

In one embodiment, each component from ($A_0, A_1, A_2, \ldots, A_N$) comprises at least one reference signal from channel state information reference signal (CSI-RS), synchronization signal block (SSB), downlink demodulation reference signal (DL DMRS), sounding reference signal (SRS), or uplink demodulation reference signal (UL DMRS).

In one embodiment, one or more of the components ($A_0, A_1, A_2, \ldots, A_N$) is not included in the TCI state. When $A_0$ is not included, then for each $n \in \{1, \ldots, N\}$, the component $A_n$ indicates the beam for entity $E_n$. When $A_n$ is not included for an $n \in \{1, \ldots, N\}$, the component $A_0$ indicates the beam for entity $E_n$.

In one embodiment, N=2.

In one embodiment, the entity $E_1$ comprises at least one of DL channels, physical downlink control channel (PDCCH) or physical downlink shared channel (PDSCH), and the entity $E_2$ comprises at least one of UL channels, physical uplink control channel (PUCCH), physical uplink shared channel (PUSCH), or physical random access channel (PRACH).

In one embodiment, the entity $E_1$ comprises physical downlink control channel (PDCCH), and the entity $E_2$ comprises physical downlink shared channel (PDSCH).

In one embodiment, the beam indication indicating the TCI state is via downlink control information (DCI).

In one embodiment, each component from ($A_0, A_1, A_2, \ldots, A_N$) comprises at least one reference signal from channel state information reference signal (CSI-RS), synchronization signal block (SSB), downlink demodulation reference signal (DL DMRS), sounding reference signal (SRS), or uplink demodulation reference signal (UL DMRS).

In one embodiment, one or more of the components ($A_0, A_1, A_2, \ldots, A_N$) is not included in the TCI state. When $A_0$ is not included, then for each $n \in \{1, \ldots, N\}$, the component $A_n$ indicates the beam for entity $E_n$. When $A_n$ is not included for an $n \in \{1, \ldots, N\}$, the component $A_0$ indicates the beam for entity $E_n$.

In one embodiment, N=2.

In one embodiment, the entity $E_1$ comprises at least one of DL channels, physical downlink control channel (PDCCH) or physical downlink shared channel (PDSCH), and the entity $E_2$ comprises at least one of UL channels, physical uplink control channel (PUCCH), physical uplink shared channel (PUSCH), or physical random access channel (PRACH).

In one embodiment, the entity $E_1$ comprises physical downlink control channel (PDCCH), and the entity $E_2$ comprises physical downlink shared channel (PDSCH).

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to:
      receive configuration information including information about a plurality of transmission configuration indicator (TCI) states; and
      receive a beam indication indicating a joint TCI state or a pair of separate TCI states, where the joint TCI state is common for downlink (DL) and uplink (UL), and the pair of separate TCI states comprises a DL TCI state and an UL TCI state; and
   a processor coupled to the transceiver, the processor configured to:
      when the beam indication indicates the joint TCI state, determine a beam based on the joint TCI state, and apply the beam for both receiving DL signals, and transmitting UL signals, or
      when the beam indication indicates the pair of separate TCI states,
         determine a DL beam based on the DL TCI state and an UL beam based on the UL TCI state, and
         apply the DL beam for receiving DL signals and the UL beam for transmitting UL signals.

2. The UE of claim 1, wherein the beam indication indicating the joint TCI state or the pair of separate TCI states is via downlink control information (DCI).

3. The UE of claim 1, wherein:
   the DL signals correspond to physical downlink control channel (PDCCH), physical downlink shared channel (PDSCH), or channel state information reference signal (CSI-RS), and
   the UL signals correspond to physical uplink control channel (PUCCH), physical uplink shared channel (PUSCH), or sounding reference signal (SRS).

4. The UE of claim 1, wherein each TCI state comprises a TCI state ID and at least one source reference signal (RS).

5. The UE of claim 4, wherein:
   the at least one source RS in the joint TCI state provides a reference for both a spatial quasi co-location (QCL) type for DL signals, and an UL spatial filter for UL signals, and the beam corresponds to both the spatial QCL type and the UL spatial filter,
   the at least one source RS in the DL TCI state provides a reference for a spatial QCL type for DL signals, and the DL beam corresponds to the spatial QCL type, and
   the at least one source RS in the UL TCI state provides a reference for an UL spatial filter for UL signals, and the UL beam corresponds to the UL spatial filter.

6. The UE of claim 4, wherein the at least one source RS is from a channel state information reference signal (CSI-RS), a synchronization signal block (SSB), or a sounding reference signal (SRS).

7. The UE of claim 1, wherein the transceiver is further configured to receive an information about a TCI state type via radio resource control (RRC), where the TCI state type comprises one of two types, one type for the joint TCI state and another type for the pair of separate TCI states.

8. A base station (BS) comprising:
   a processor configured to:
      generate configuration information including information about a plurality of transmission configuration indicator (TCI) states; and
      generate a beam indication indicating a joint TCI state or a pair of separate TCI states, where the joint TCI state is common for downlink (DL) and uplink (UL), and the pair of separate TCI states comprises a DL TCI state and an UL TCI state; and a transceiver operably coupled to the processor, the transceiver configured to:
transmit the configuration information;
transmit the beam indication;
transmit DL signals and receive UL signals; and
when the beam indication indicates the joint TCI state,
a beam for both reception of the DL signals and transmission of the UL signals is based on the joint TCI state, or
when the beam indication indicates the pair of separate TCI states,
a DL beam for reception of the DL signals is based on the DL TCI state and an UL beam for transmission of the UL signals is based on the UL TCI state.

9. The BS of claim 8, wherein the beam indication indicating the joint TCI state or the pair of separate TCI states is via downlink control information (DCI).

10. The BS of claim 8, wherein:
the DL signals correspond to physical downlink control channel (PDCCH), physical downlink shared channel (PDSCH), or channel state information reference signal (CSI-RS), and
the UL signals correspond to physical uplink control channel (PUCCH), physical uplink shared channel (PUSCH), or sounding reference signal (SRS).

11. The BS of claim 8, wherein each TCI state comprises a TCI state ID and at least one source reference signal (RS).

12. The BS of claim 11, wherein:
the at least one source RS in the joint TCI state provides a reference for both a spatial quasi co-location (QCL) type for DL signals, and an UL spatial filter for UL signals, and the beam corresponds to both the spatial QCL type and the UL spatial filter,
the at least one source RS in the DL TCI state provides a reference for a spatial QCL type for DL signals, and the DL beam corresponds to the spatial QCL type, and
the at least one source RS in the UL TCI state provides a reference for an UL spatial filter for UL signals, and the UL beam corresponds to the UL spatial filter.

13. The BS of claim 11, wherein the at least one source RS is from a channel state information reference signal (CSI-RS), a synchronization signal block (SSB), or a sounding reference signal (SRS).

14. The BS of claim 8, wherein the transceiver is further configured to receive an information about a TCI state type via radio resource control (RRC), where the TCI state type comprises one of two types, one type for the joint TCI state and another type for the pair of separate TCI states.

15. A method for operating a user equipment (UE), the method comprising:
receiving configuration information including information about a plurality of transmission configuration indicator (TCI) states;
receiving a beam indication indicating a joint TCI state or a pair of separate TCI states, where the joint TCI state is common for downlink (DL) and uplink (UL), and the pair of separate TCI states comprises a DL TCI state and an UL TCI state; and
when the beam indication indicates the joint TCI state,
determining a beam based on the joint TCI state, and
applying the beam for both receiving DL signals, and transmitting UL signals, or when the beam indication indicates the pair of separate TCI states,
determining a DL beam based on the DL TCI state and an UL beam based on the UL TCI state, and
applying the DL beam for receiving DL signals and the UL beam for transmitting UL signals.

16. The method of claim 15, wherein the beam indication indicating the joint TCI state or the pair of separate TCI states is via downlink control information (DCI).

17. The method of claim 15, wherein:
the DL signals correspond to physical downlink control channel (PDCCH), physical downlink shared channel (PDSCH), or channel state information reference signal (CSI-RS), and
the UL signals correspond to physical uplink control channel (PUCCH), physical uplink shared channel (PUSCH), or sounding reference signal (SRS).

18. The method of claim 15, wherein each TCI state comprises a TCI state ID and at least one source reference signal (RS).

19. The method of claim 18, wherein:
the at least one source RS in the joint TCI state provides a reference for both a spatial quasi co-location (QCL) type for DL signals, and an UL spatial filter for UL signals, and the beam corresponds to both the spatial QCL type and the UL spatial filter,
the at least one source RS in the DL TCI state provides a reference for a spatial QCL type for DL signals, and the DL beam corresponds to the spatial QCL type, and
the at least one source RS in the UL TCI state provides a reference for an UL spatial filter for UL signals, and the UL beam corresponds to the UL spatial filter.

20. The method of claim 15, further comprising receiving an information about a TCI state type via radio resource control (RRC), where the TCI state type comprises one of two types, one type for the joint TCI state and another type for the pair of separate TCI states.

* * * * *